United States Patent
Sakhnini et al.

(10) Patent No.: US 12,126,554 B2
(45) Date of Patent: Oct. 22, 2024

(54) QUASI-LOCATION CONFIGURATION FOR LEAN PILOT SIGNALS

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/302,758

(22) Filed: May 11, 2021

(65) Prior Publication Data

US 2021/0359809 A1 Nov. 18, 2021

Related U.S. Application Data

(60) Provisional application No. 63/023,821, filed on May 12, 2020.

(51) Int. Cl.
*H04L 5/00* (2006.01)
*H04W 56/00* (2009.01)

(52) U.S. Cl.
CPC ......... *H04L 5/0048* (2013.01); *H04W 56/001* (2013.01)

(58) Field of Classification Search
CPC ..... H04W 56/001; H04L 5/0048; H04L 5/001
See application file for complete search history.

(56) References Cited

U.S. PATENT DOCUMENTS

| | | | |
|---|---|---|---|
| 2017/0245165 A1* | 8/2017 | Onggosanusi | H04W 24/08 |
| 2019/0058517 A1* | 2/2019 | Kang | H04B 7/0626 |
| 2019/0173719 A1* | 6/2019 | Qin | H04L 27/26136 |
| 2019/0261244 A1* | 8/2019 | Jung | H04L 5/0048 |
| 2019/0296956 A1* | 9/2019 | John Wilson | H04L 5/0098 |
| 2019/0306850 A1* | 10/2019 | Zhang | H04B 7/0626 |
| 2019/0335443 A1* | 10/2019 | Liu | H04B 7/0695 |
| 2020/0068512 A1* | 2/2020 | Xue | H04L 27/2657 |

* cited by examiner

*Primary Examiner* — Yee F Lam
(74) *Attorney, Agent, or Firm* — Arun Swain

(57) ABSTRACT

A user equipment (UE) may be configured to apply a set of parameters associated with receiving at least one pilot signal over a time period for receiving at least one SS that is quasi-collocated with the at least one pilot signal. The UE may be further configured to receive the at least one SS based on applying the set of parameters over the time period. A base station may be configured to transmit at least one pilot signal using a first set of transmission parameters. The base station may be further configured to transmit a SS that occupies a single symbol using a second set of transmission parameters quasi-collocating the SS with the at least one pilot signal.

25 Claims, 12 Drawing Sheets

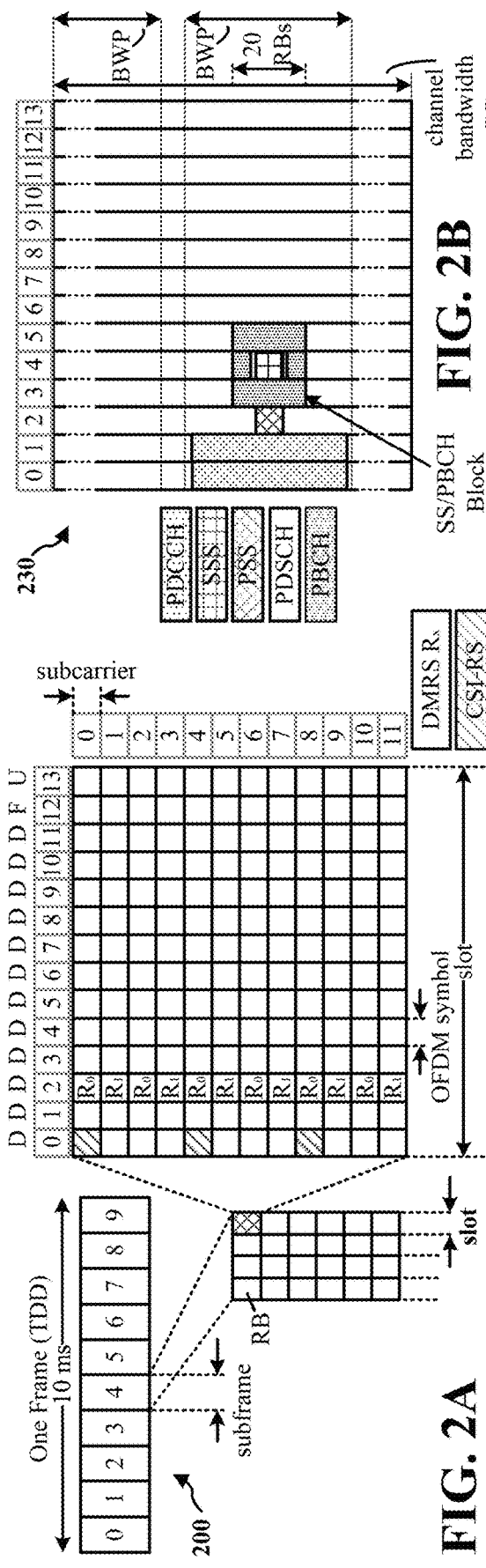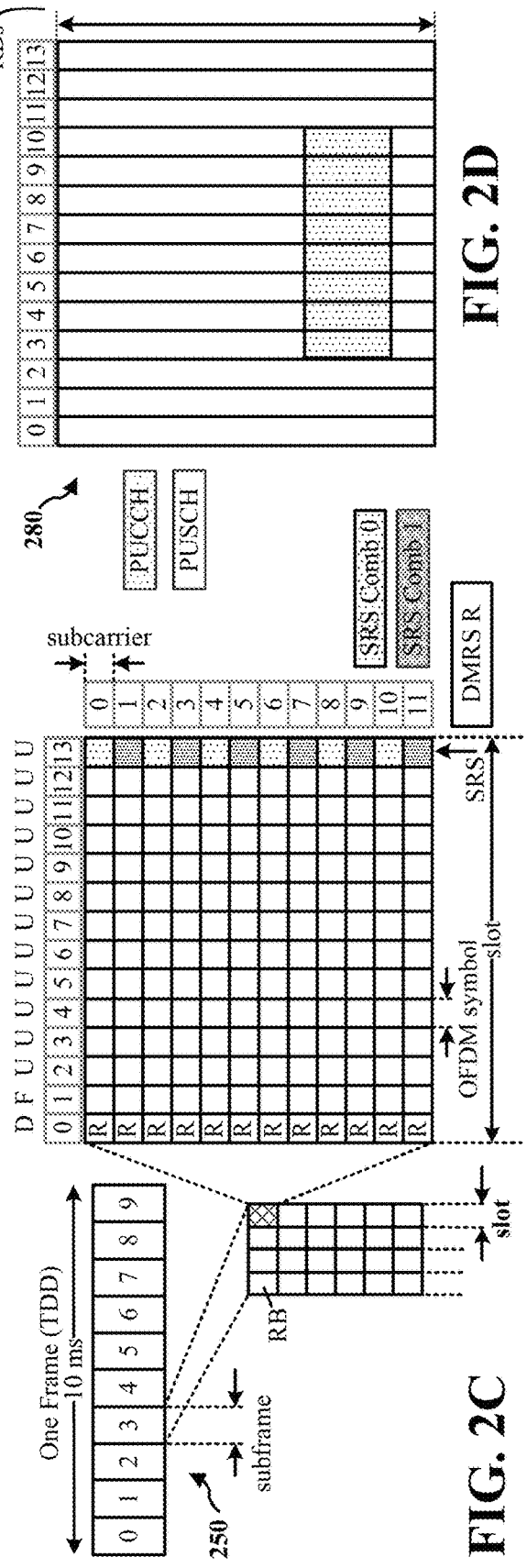
FIG. 2A
FIG. 2B
FIG. 2C
FIG. 2D

QUASI-LOCATION CONFIGURATION FOR LEAN PILOT SIGNALS

CROSS REFERENCE TO RELATED APPLICATION(S)

This application claims the benefit of U.S. Provisional Application Ser. No. 63/023,821, entitled "SYSTEM AND METHOD FOR DETERMINING QUASI-COLOCATION RELATIONSHIPS ASSOCIATED WITH PERIODIC SINGLE-SYMBOL SYNCHRONIZATION SIGNALS" and filed on May 12, 2020, the disclosure of which is expressly incorporated by reference herein in its entirety.

BACKGROUND

Technical Field

The present disclosure generally relates to communication systems, and more particularly, to transmission of a set of pilot signals based upon a set of parameters used for transmitting another set of signals.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example radio access technology (RAT), a base station may periodically transmit synchronization signal (SS) and physical broadcast channel (PBCH) blocks in a cell in order to provide user equipment (UE) with information to synchronize with and initially access the cell. Once initial access in completed, a UE may continue to use such SS/PBCH blocks for tracking, measurements, beam management, and the like. However, the SS/PBCH blocks may include more information than is necessary for the UE to perform the aforementioned operations, and therefore, the SS/PBCH blocks may cause avoidable overhead once the UE has initially accessed the cell.

In order to mitigate the overhead commensurate with the SS/PBCH blocks, the base station may periodically transmit a single-symbol SS block (SSB), which may also be known as a "lean SSB." The periodic lean SSB may include either a primary SS or a secondary SS, and the UE may use the periodic lean SSB for tracking, measurements, beam management, and the like in order to reduce signaling and/or computation overhead once the UE has initially accessed the cell.

However, in order to receive additional signaling, such as the periodic lean SSB, the UE may need to track various parameters for the additional signaling, such as Doppler shift, Doppler spread, average delay, delay spread, and/or receive (RX) spatial information. Tracking by the UE in order to receive the periodic lean SSB may cause some different overhead, which may defeat the purpose of the periodic lean SSB. Accordingly, a need exists for approaches to receiving the periodic lean SSB that mitigate the consumption of time, signaling, and/or computational resources commensurate with receiving the periodic lean SSB by the UE.

The present disclosure describes various techniques and solutions for efficiently receiving the periodic lean SSB. Specifically, the present disclosure provides for periodic lean SSBs having a quasi-colocation (QCL) relationship with one or more other signals transmitted by the base station, e.g., rather than introducing additional tracking operations to the UE for receiving periodic lean SSBs. Thus, additional signal tracking may be mitigated while the UE still experiences the benefits of the periodic lean SSB.

In an aspect of the disclosure, a method, a computer-readable medium, and an apparatus are provided. The apparatus may be a UE or a component thereof configured to apply a set of parameters associated with receiving at least one pilot signal over a time period for receiving at least one SS that is quasi-collocated with the at least one pilot signal. The apparatus may be further configured to receive the at least one SS based on applying the set of parameters over the time period.

In another aspect of the disclosure, another method, another computer-readable medium, and another apparatus are provided. The other apparatus may be a base station or a component thereof configured to transmit at least one pilot signal using a first set of transmission parameters. The other apparatus may be further configured to transmit a SS that occupies a single symbol using a second set of transmission parameters quasi-collocating the SS with the at least one pilot signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
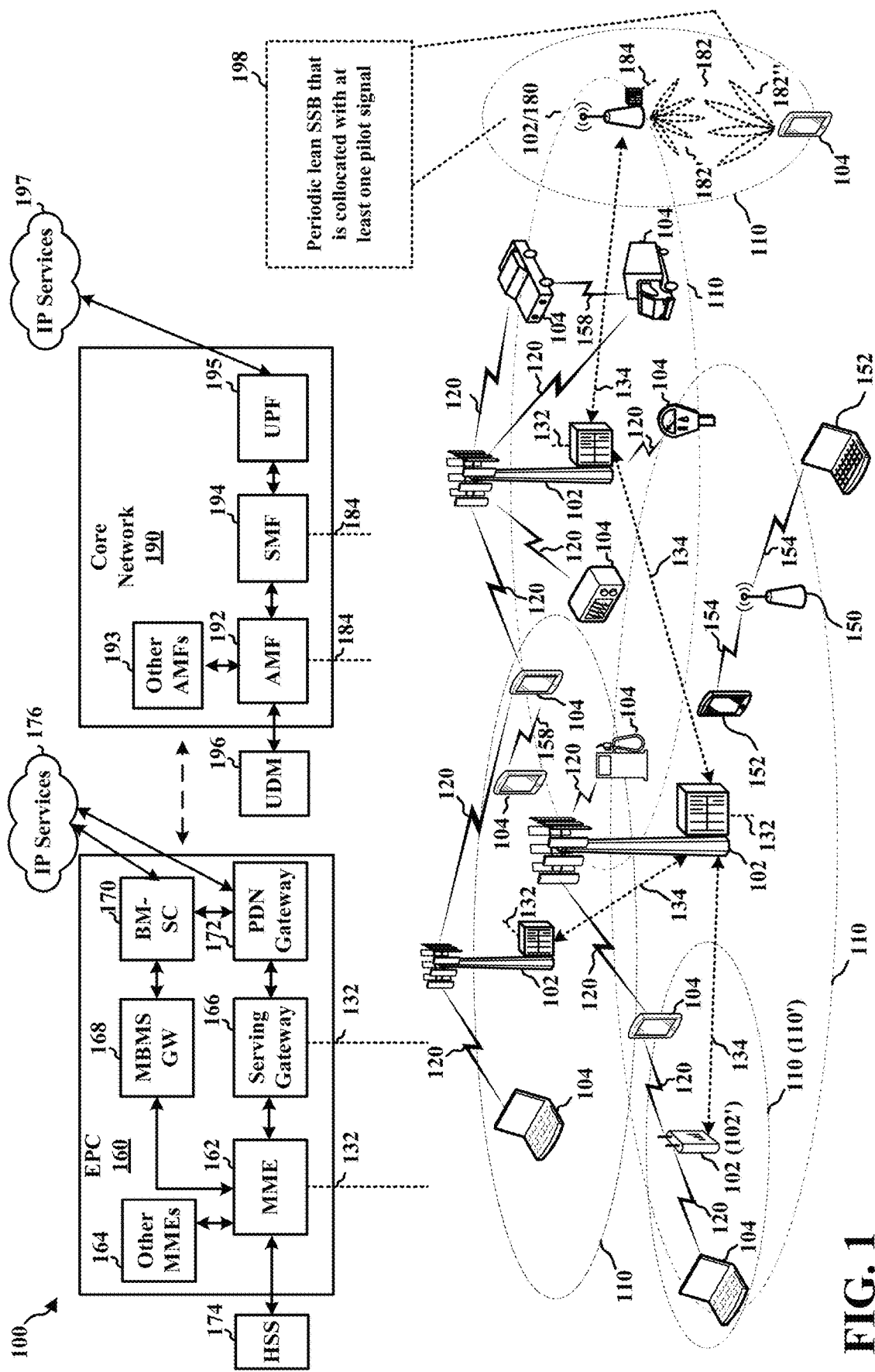
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, any person having ordinary skill in the art will recognize that these concepts and related aspects may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, the base station(s) 102 operating as an IAB donor(s) may provide a link to the one of the EPC 160 and/or the core network 190 for other IAB nodes, which may be directly or indirectly (e.g., separated from an IAB donor by more than one hop) and/or one or more of the UEs 104, both of which may have communicate with a DU(s) of the IAB donor(s). In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless and other radio links may be on one or more carriers, or component carriers (CCs). The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (e.g., x CCs, used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MIME) at the core network level, and the UE is configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz," "sub-7 GHz," and the like, to the extent used herein, may broadly represent frequencies that may be less than 6 GHz, may be less than 7 GHz, may be within FR1, or may include mid-band frequencies. Further, unless specifically stated otherwise, the term "millimeter wave" and other similar references, to the extent used herein, may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 and the UE 104 may be configured to communicate signals that are quasi-collocated with one another. For example, the UE 104 may be configured to determine a quasi-collocation (QCL) relationship between a periodic single-symbol synchronization signal (SS) and one or more pilot signals received from the base station 102/180 in a coverage area 110.

Two signals (or beams via which signals are transmitted) may be quasi-collocated or may have a QCL relationship where the properties of the channel over which one signal on one antenna port is conveyed can be inferred from the properties of another channel over which another signal on another antenna port is conveyed. In practical effect, one signal is quasi-collocated with another signal where the transmission parameters used for the one signal and the transmission parameters used for the other signal result in the same set of reception parameters being used for beamformed reception of both the one signal and the other signal (potentially, the same set of transmission parameters may be used).

According to various aspects, the base station 102/180 may be configured to transmit at least one pilot signal using a first set of transmission parameters. For example, the first set of transmission parameters may include a first spatial transmit filter applied on the antenna port from which the at least one pilot signal was transmitted. The base station 102/180 may be further configured to transmit a SS that occupies a single symbol using a second set of transmission parameters that quasi-collocate the SS with at least one group of FFs. In some aspects, the SS may be referred to as a "lean" SS block (SSB), as the lean SSB may occupy fewer symbols than those SSBs transmitted in a cell with the physical broadcast channel (PBCH) and both the primary synchronization signal (PSS) and secondary synchronization signal (SSS).

The UE 104 may be configured to receive the at least one pilot signal from the base station 102/180, which the UE 104 may use to acquire information about the wireless channel on which the at least one pilot signal was transmitted. For example, the UE 104 may calculate at least one of a Doppler shift, a Doppler spread, a delay shift, an average delay, or a spatial parameter based on receiving the at least one pilot signal. The UE 104 may apply those parameters for receiving other signals that may be quasi-collocated with the at least one pilot signal. For example, the base station 102/180 may periodically transmit a lean SSB that is quasi-collocated with the at least one pilot signal.

The UE 104 may apply a set of parameters, which may be calculated based on receiving the at least one pilot signal, for receiving the at least one periodic lean SSB 198. The periodic lean SSB 198 may include either one of a PSS or an SSS, which the UE 104 may use to acquire timing synchronization and some cell identity information associated with the base station 102/180. While more than one lean SSB may be carried in a slot, each of those lean SSBs may be self-contained in a single symbol. For example, one lean SSB in a slot may carry a PSS and another lean SSB in the slot may carry an SSS. Potentially, a lean SSB carrying a PSS and a lean SSB carrying an SSS may be contiguous in the slot, whereas the PSS and the SSS may be separated by the PBCH on at least one symbol in other SSBs.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot signal, such as a reference signal (RS) for the UE. A pilot signal may include a signal that is not intended to carry payload data (although some small amount may be carried thereon) from the core network to a UE, but is intended to refer to any signal that functions to improve UE function by informing the UE of some parameters that may be applicable to operation in a cell or access network (e.g., control information) and/or by providing a mechanism via which the UE is can acquire timing, synchronization, and other network properties. To that end, a pilot signal may be any of an RS, an SS, a tracking reference signal (TRS), or other signal of the same or similar type or nature.

In some configurations, an RS may include at least one demodulation RS (DM-RS) (indicated as $R_x$ for one particular configuration, where 100× is the port number, but other DM-RS configurations are possible) and/or at least one channel state information (CSI) RS (CSI-RS) for channel estimation at the UE. In some other configurations, a pilot signal (or RS) may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A base station may activate a BWP for a UE, which may configure the UE to monitor certain resources and receive certain signals on the active BWP, such as a CORESET and a TRS, respectively. Other BWPs may be inactive or deactivated, and the UE may not be expected to monitor resources or receive signals on those BWPs.

A UE may acquire timing synchronization and/or cell identity information from at least one SS. A PSS may be within symbol 2 of particular subframes of a frame. The PSS is used by a UE 104 to determine subframe/symbol timing and a physical layer identity. An SSS may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The PBCH, which carries a master information block (MIB), may be transmitted together with the PSS and SSS to form an SS/PBCH block (also referred to as SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
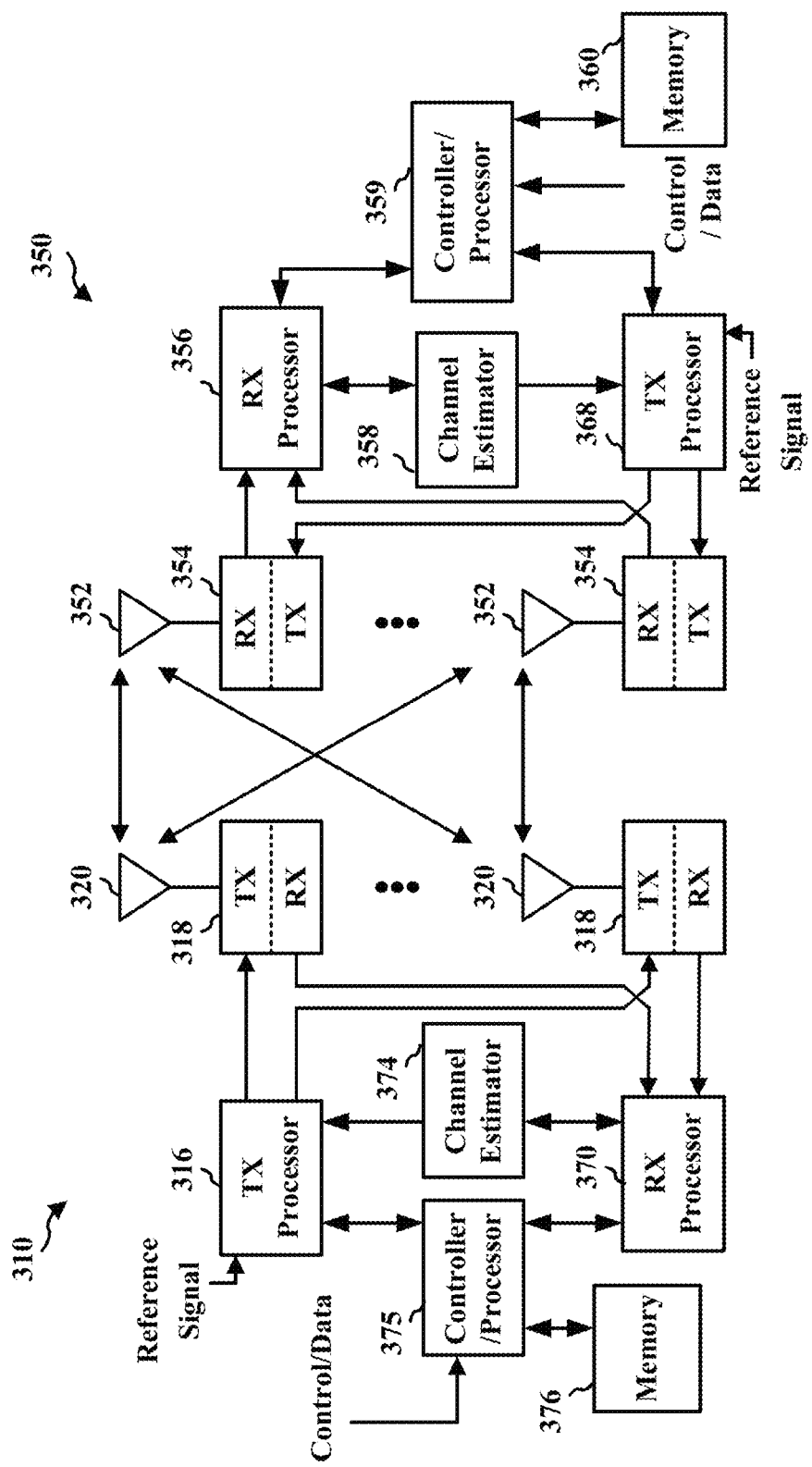
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through at least one respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through at least one respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the periodic lean SSB 198 of FIG. 1.

In some other aspects, at least one of the TX processor 316, the RX processor 370, and the controller/processor 375 may be configured to perform aspects in connection with the periodic lean SSB 198 of FIG. 1.

Some RATs may (e.g., a 5G NR RAT) define periodic transmission of some SS/PBCH blocks by a base station in a cell in order to provide UEs with information to synchronize with and initially access cells in the RAN. Once initial access in completed, a UE may continue to use the SS/PBCH blocks in a cell for tracking, measurements, beam management, and the like. However, the SS/PBCH blocks may include more information than is necessary for the UE to perform the aforementioned operations, and therefore, the SS/PBCH blocks may cause avoidable overhead once the UE has initially accessed the cell.

In order to mitigate the overhead commensurate with the SS/PBCH blocks, the base station may periodically transmit a single-symbol SSB, which may also be known as a "lean SSB." The periodic lean SSB may include either a PSS or an SSS, and the UE may use the periodic lean SSB for tracking, measurements, beam management, and the like in order to reduce signaling and/or computation overhead once the UE has initially accessed the cell.

However, in order to receive additional signaling, such as the periodic lean SSB, the UE may need to track various parameters for the additional signaling, such as Doppler shift, Doppler spread, average delay, delay spread, and/or RX spatial information. RX spatial information may include, for example, at least one RX spatial parameter derived from the beamforming properties with which the additional signaling is received, such as (dominant) angle of arrival (AoA), average AoA), and so forth.

Tracking by the UE in order to receive the periodic lean SSB may cause some different overhead, which may defeat the purpose of the periodic lean SSB. Accordingly, a need exists for approaches to receiving the periodic lean SSB that mitigate the consumption of time, signaling, and/or computational resources commensurate with receiving the periodic lean SSB by the UE.

FIGS. 4-10 describe various techniques and solutions for efficiently receiving the periodic lean SSB. Specifically, FIGS. 4-10 provide for periodic lean SSBs that have a QCL relationship with one or more other signals transmitted by the base station, e.g., rather than introducing additional tracking operations to the UE for receiving periodic lean SSBs. Thus, additional signal tracking may be mitigated while the UE still experiences the benefits of the periodic lean SSB.

Figure 4:
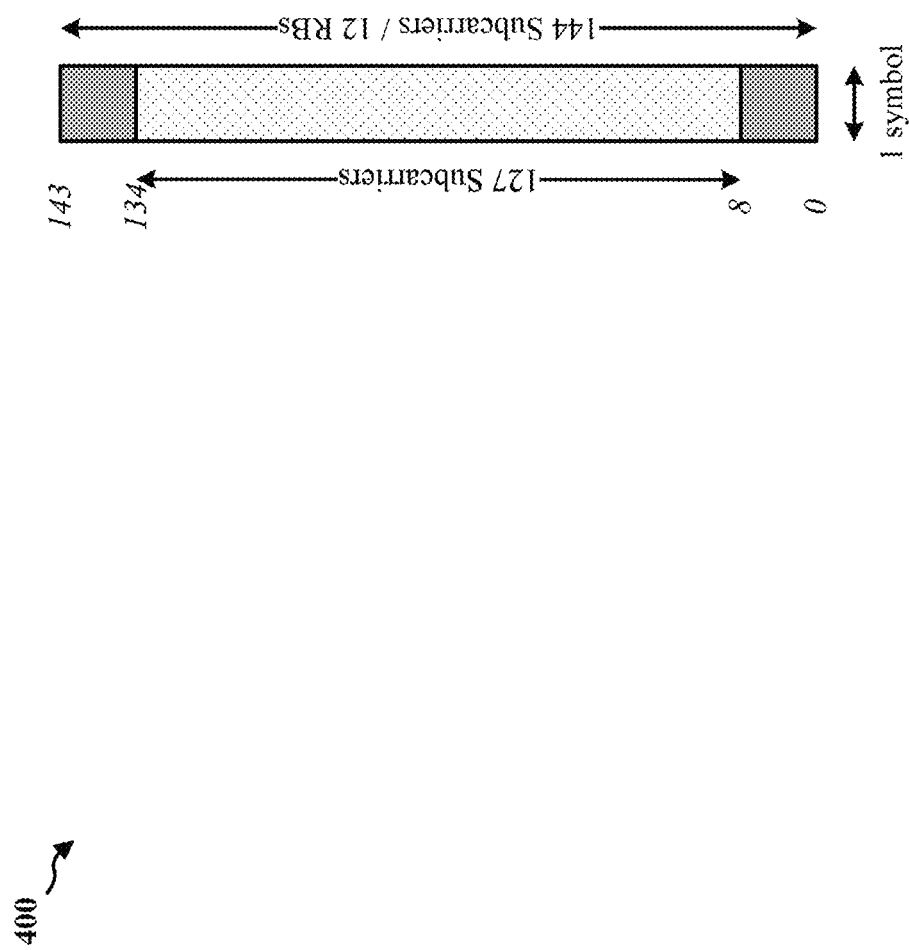
FIG. 4 is a diagram illustrating an example periodic lean synchronization signal block (SSB).

FIG. 4 is a diagram illustrating an example periodic lean SSB 400, in accordance with some aspects of the present disclosure. According to an example RAT (e.g., 5G NR RAT), a base station may transmit a set of SS/PBCH blocks (see, e.g., FIG. 2B) in a cell provided by the base station. A UE in the cell may receive at least one of the SS/PBCH blocks. Directional beamforming may be used for communication of the SS/PBCH blocks in the cell. For example, referring back to the beamforming 182 of FIG. 1, the base station 102/180 may transmit each of the set of SS/PBCH blocks via a respective TX beam in a respective one of the TX directions 182'. Correspondingly, the UE 104 may receive each of a subset of the set of transmitted SS/PBCH blocks via an RX beam in a respective one of RX directions 182".

The UE may use at least one of the received SS/PBCH block(s) for initial access, tracking, measurements, and the like, e.g., in order to camp on the cell. Even after initial access by the UE, the base station may (periodically) transmit SS/PBCH blocks, which the UE may use to perform further tracking, beam management, and/or other measurements (e.g., L1 measurements) after initial access. However, the SS/PBCH block may carry some information that is no longer useful to the UE following initial access, and therefore, may contribute to unnecessary overhead.

Communication between the UE and the base station may still rely on some SSs, e.g., due to UE mobility within the cell, changing channel conditions, etc. As aforementioned, however, not all parts of SS/PBCH blocks may be useful to the UE after initial access. Thus, some synchronization signaling between the UE and the base station may be transitioned to a narrow BWP after initial access to the cell by the UE. Potentially, the narrow BWP may reuse at least a portion of the bandwidth to which the SS/PBCH blocks are assigned.

In the narrow BWP, the base station may transmit some synchronization signaling that may allow the UE to continue to perform time/frequency tracking, measurements (e.g., L1 measurements), beam management, and the like with the base station, although with relatively minimal changes (e.g., similar L1 measurements). Specifically, a single-symbol SS may be transmitted by the base station for use by the UE, e.g., in order to perform time/frequency tracking, measurements (e.g., L1 measurements), beam management, and/or other over-the-air communication procedures after initial access to the cell by the UE. The single-symbol SS may be referred to as a lean SSB 400.

The lean SSB 400 may be either a PSS or an SSS that is one symbol in the time domain. The lean SSB 400 may be dense in the frequency domain (e.g., every tone), and suitable to be carried on a narrow BWP. In some aspects, for example, the lean SSB 400 may span 144 subcarriers or twelve RBs. However, the PSS or SSS of the lean SSB 400 may span 127 subcarriers, but may be both preceded and succeeded by a respective set of eight subcarriers set to 0. In some aspects, the lean SSB 400 may be transmitted by the base station in a set of narrow BWP with frequency hopping.

Similar to the SS/PBCH block, the lean SSB 400 may be transmitted using directional beamforming. For example, the base station may transmit each lean SSB 400 of a set in a respective TX direction via a respective TX beam. Correspondingly, the UE may receive at least one lean SSB 400 in a respective RX direction via a respective RX beam. For example, referring back to the beamforming 182 of FIG. 1, the base station 102/180 may transmit each of a set of lean SSBs via a respective TX beam in a respective one of the TX directions 182'. Correspondingly, the UE 104 may receive each of a subset of the set of transmitted lean SSBs via an RX beam in a respective one of RX directions 182"

Figure 5:
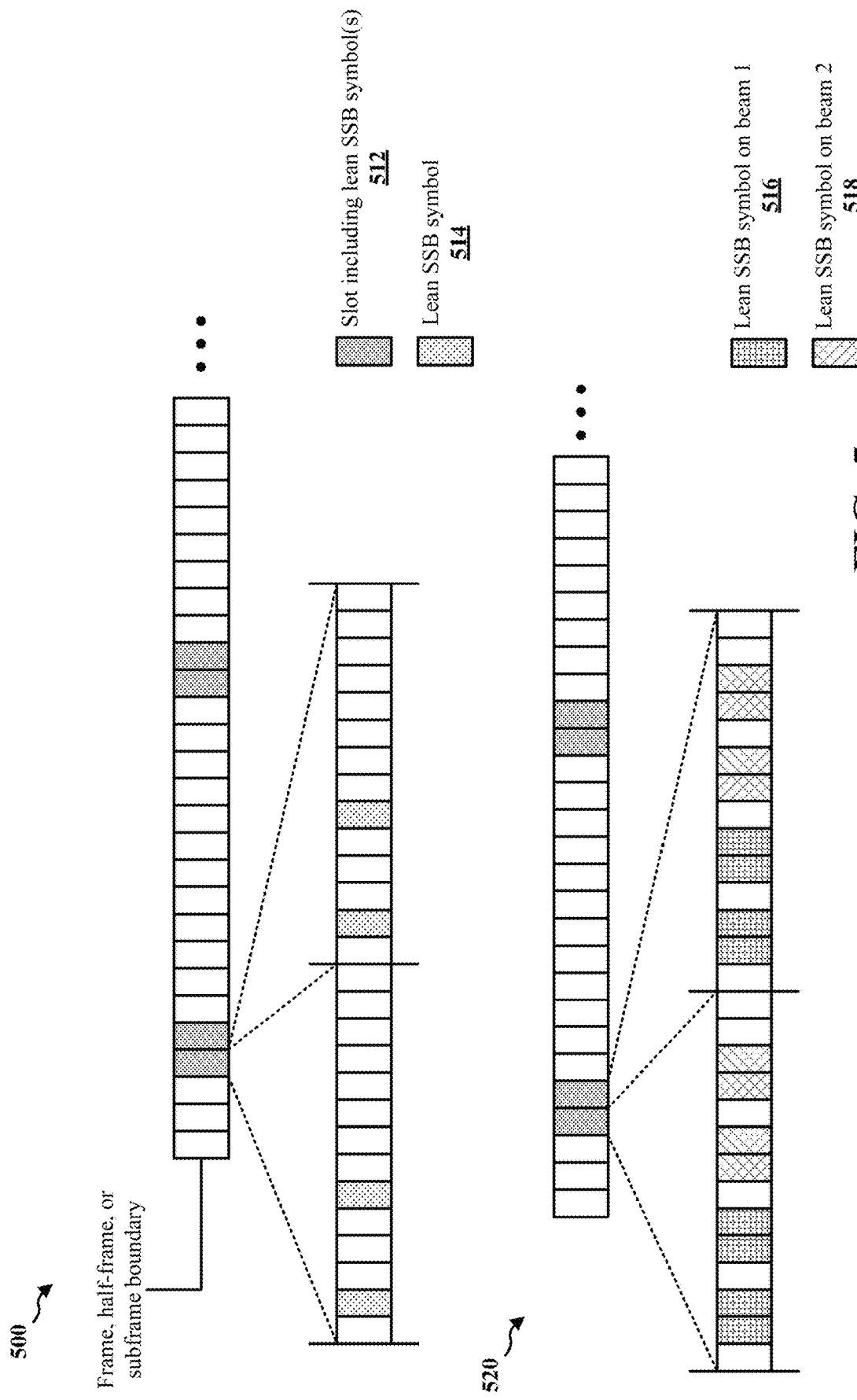
FIG. 5 is a diagram illustrating an example configuration of periodic lean SSBs in a wireless communication system.

FIG. 5 is a diagram illustrating example configurations 500, 520 of periodic transmission of lean SSBs in a wireless communication system. A UE may use a lean SSB for time/frequency tracking, measurements (e.g., L1 measurements), beam management, and so forth that may need to be updated at various times, for example, due to UE mobility, changing channel conditions, blockers in the cell, etc. Therefore, lean SSBs may be configured to be periodically transmitted. In some aspects, the lean SSBs may be configured with a periodicity such that the need for additional CSI-RS resources is reduced.

The periodicity of lean SSB transmission may be configurable at the levels of frames, half-frames, and/or subframes. For example, a set of slots 512 may be configured to carry lean SSB symbols 514, e.g., for frequency tracking. In a first configuration 500, a pair of consecutive slots 512 may be configured to carry lean SSB symbols 514, and a plurality of slots may occur between each of pair of consecutive slots 512. The number of slots 512 carrying lean SSB symbols 514, as well as the number of slots occurring between each of the slots 512 carrying lean SSB symbols 514, may be configurable, e.g., based on UE mobility, the type of cell, and/or other factors.

Further to the first configuration 500, the number of lean SSB symbols 514 within each of the slots 512 may be configurable. That is, while the slots 512 of the first configuration 500 are illustrated as including two lean SSB symbols 514, the number and location of the lean SSB symbols 514 within a slot 512 may be configurable e.g., based on UE mobility, the type of cell, and/or other factors. For example, one, some, or all of the symbols within a slot configured to include a lean SSB may configured to as lean SSB symbols 514.

As shown in the second configuration 520, slots 512 including lean SSB symbols may be configured to allow for beam multiplexing and/or beam repetition (e.g., for RX beam refinement by the UE). For example, lean SSBs of different sets may be transmitted on different beams and/or lean SSBs of the same set may be transmitted on different beams. Illustratively, for beam multiplexing, one beam (e.g., beam 1) may be used to transmit lean SSB symbols 516 of one set, whereas another beam (e.g., beam 2) may be used to transmit lean SSB symbols 518 of another set. For beam repetition, however, one beam (e.g., beam 1) may be used to transmit lean SSB symbols 516 of one set, and another beam (e.g., beam 2) may be used to transmit lean SSB symbols 518 of the same set.

As a base station may periodically transmit lean SSBs via a set of TX beams and a UE may periodically receive the lean SSBs via a set of RX beams, one or more QCL relationships may be defined for the periodic lean SSBs. For example, a periodic lean SSB communicated at a first antenna port may be quasi-collocated with an RS communicated at a second antenna port when the properties of the channel over which the lean SSB symbol on the first antenna port is conveyed can be inferred from the channel over which the RS symbol on the second antenna port is conveyed.

The properties may include Doppler shift, Doppler spread, average delay, delay spread, and RX spatial information (e.g., beam information). Thus, when a UE identifies one or more properties of one RS signal, the UE may use those one or more properties as parameters for receiving a lean SSB based on a QCL relationship.

Figure 6:
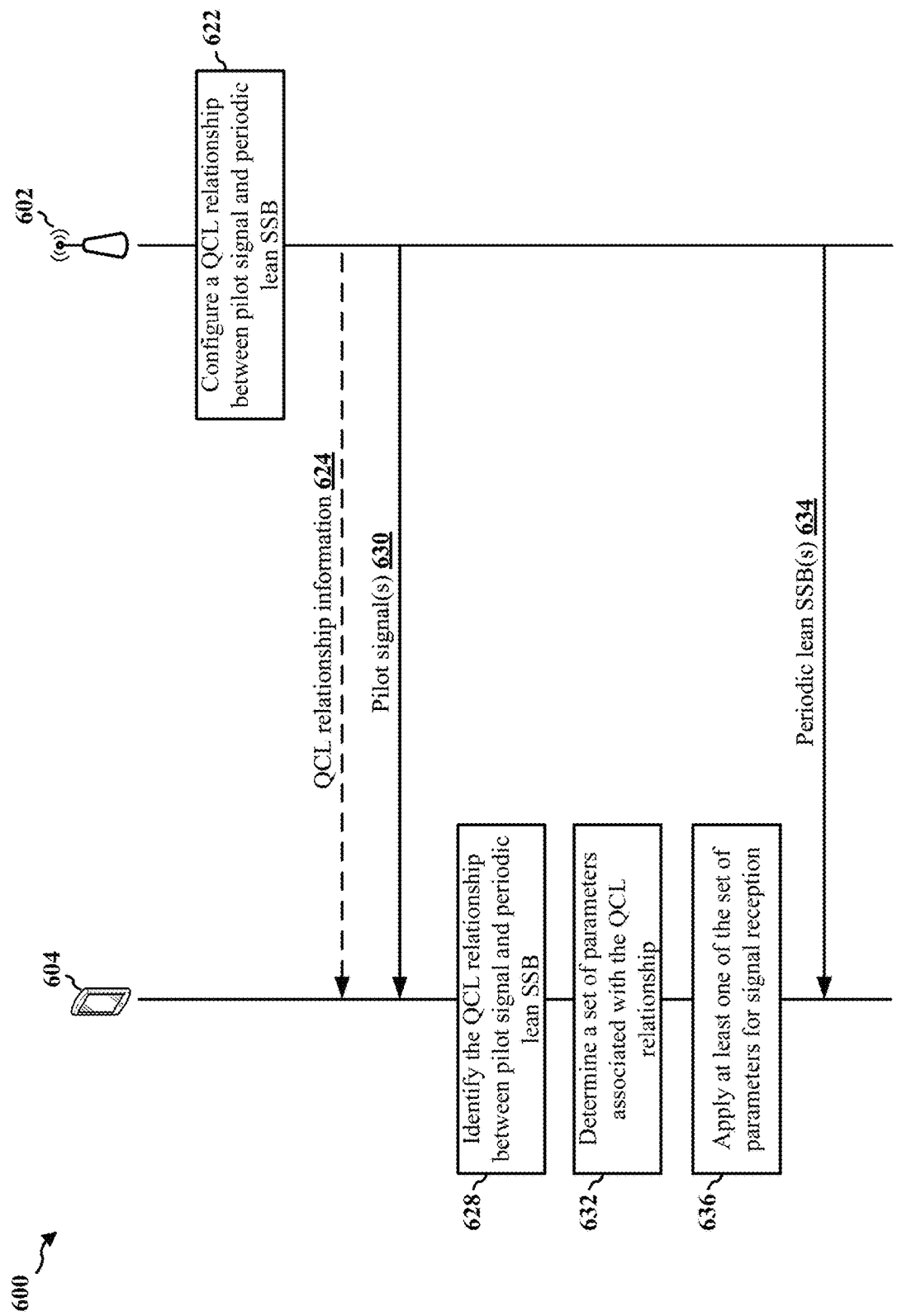
FIG. 6 is a call flow diagram illustrating example operations in an access network.

FIG. 6 is a call flow diagram illustrating example operations in an access network 600 for determining a QCL relationship associated with a lean SSB. In various aspects, a base station 602 may configure 622 a QCL relationship between at least one pilot signal and at least one periodic lean SSB. For example, the base station 602 may select a first set of TX parameters for transmission of the at least one pilot signal, such as a spatial filter or spatial filtering parameter, a set of beamforming weights, a precoding matrix, etc. that may focus the signal (or the main beam lobe) in a specific direction, such as a particular sector in a cell. The base station 602 may select a second set of TX parameters for transmission of at least one periodic lean SSB. The first and the second set of TX parameters may cause at least one pilot signal and at least one lean SSB to be conveyed on wireless channels that are substantively similar—e.g., so that receive parameters applied to receiving the at least one pilot signal may also be applied for receiving the at least one PSS or SSS.

In some aspects, the at least one pilot signal (e.g., the pilot signal(s) 630) may be, for example, an SS/PBCH block that includes a PSS and an SSS separately surrounded by resources on a PBCH, at least one CSI-RS, and/or at least one tracking reference signal (TRS), whereas the at least one periodic lean SSB (e.g., the periodic lean SSB(s) 634) may include either a PSS or an SSS in one symbol carried on a narrow BWP (e.g., the SSB may be less than the number Hz in the frequency domain), and having a periodicity configurable by the base station 602.

A QCL relationship may be associated with at least one of QCL Type, such as QCL Types A, B, C, or D. The QCL Type may indicate a set (or subset of a set) of parameters or properties shared between two signals, which may be characterized as transmitted via the "same beam" in some instances. Such parameters and properties may include, inter alia, shared or common settings, configurations, and tunings (e.g., antenna tuning) for one or more of a precoder, spatial filter, set of beamforming weights, antenna direction and/or directivity, main lobe, antenna port, etc. Additionally or alternatively, the parameters and properties Such parameters and properties may include, inter alia, shared or common wireless channel properties, such as information related to the number and/or quality of multipath components, channel fading estimations, and the like.

For example, the at least one pilot signal and the at least one periodic lean SSB may have a QCL relationship indicating the two share, or are substantively similar with respect to, at least one of a Doppler shift, Doppler spread, average delay, delay spread, and RX spatial information (e.g., beam information, such as spatial RX filter, dominant AoA, average AoA, etc.). For example, QCL Type A indicates that Doppler shift, Doppler spread, average delay, and delay spread are shared between the at least one pilot signal and the at least one periodic lean SSB; QCL Type B indicates that Doppler shift and Doppler spread are shared between the at least one pilot signal and the at least one periodic lean SSB; QCL Type C indicates that Doppler shift and average delay are shared between the at least one pilot signal and the at least one periodic lean SSB; and QCL Type D indicates that RX spatial information (e.g., RX beam or RX spatial parameters) is shared between the at least one pilot signal and the at least one periodic lean SSB.

In some aspects, the base station 602 may configure 622 the QCL relationship between at least one pilot signal and at least one periodic lean SSB for a UE 604 based on one or more measurements received from the UE 604. For example, the base station 602 may transmit one or more signals (e.g., SS/PBCH blocks, TRSs, etc.) to the UE 604, and the UE 604 may perform one or more measurements (e.g., L1 measurements) on those one or more signals received from the base station 602. The base station 602 may then determine the properties to be shared between the at least one pilot signal and the at least one periodic lean SSB, e.g., for the QCL relationship between the at least one pilot signal and the at least one periodic lean SSB.

The base station 602 may configure 622 the QCL relationship between the at least one pilot signal and the at least one periodic lean SSB to include at least one of QCL Type C and/or QCL Type D. For other parameters not covered by QCL Type C and/or QCL Type D, the base station 602 may configure 622 the QCL relationship between the at least one pilot signal and the at least one periodic lean SSB to include those parameters, as well. For example, QCL Type C may be based upon average delay and Doppler shift, but may not necessarily cover Doppler spread, delay spread, and/or RX spatial filtering parameter(s). On the other hand, QCL Type D may take into account the RX spatial filtering parameter (s) but may not cover and of Doppler shift, Doppler spread, average delay, or delay spread.

The base station 602 may determine that the QCL relationship includes those other parameters for the at least one pilot signal having the QCL relationship associated with QCL Type C and/or QCL Type D, or the base station 602 may determine that the QCL relationship includes those other parameters for at least one second RS (e.g., another SS/PBCH block, another CSI-RS, and/or another TRS). In another aspect, the base station 602 may determine that those other parameters not covered by QCL Type C and/or QCL Type D should be absent from the QCL relationship between the at least one pilot signal and the at least one periodic lean SSB. In such an aspect, the UE 604 may be configured to locate the at least one periodic lean SSB and independently determine those other parameters, such as by performing measurements and/or tracking to determine the relevant one(s) of the Doppler shift, Doppler spread, average shift, and/or average delay for receiving the at least one periodic lean SSB.

According to that which is configured by the base station 602, the UE 604 may identify 628 the QCL relationship associated with at least periodic lean SSB transmitted by the base station 602. According to different aspects, the base station 602 may explicitly or implicitly indicate (e.g., configure or modify) the QCL relationship to the UE 604, and therefore, the UE 604 may identify 628 the QCL relationship differently in different aspects.

In one aspect, the base station 602 may explicitly indicate the QCL relationship between the at least one pilot signal and the at least one periodic lean SSB to the UE 604 by transmitting one or more messages to the UE 604. That is, the base station 602 may transmit QCL relationship information 624 to the UE 604 that indicates to the UE 604 the QCL relationship between the at least one pilot signal and the at least one periodic lean SSB, such as information indicating QCL Type C and/or QCL Type D and information indicating the at least one pilot signal is associated with QCL Type C and/or QCL Type D.

Potentially, the base station 602 may include, in the QCL relationship information 624, one or more other parameters that are shared between the at least one pilot signal and the at least one periodic lean SSB that are not covered by QCL Type C and/or QCL Type D.

In one aspect, the QCL relationship information 624 may indicate a transmission configuration indication (TCI) state identifier (ID). For example, the base station 602 may include the TCI state ID in a DCI message.

The TCI state ID may correspond to TCI state configuration information, such as a table (e.g., a lookup table) that may be indexed by the TCI state ID. The TCI state configuration information may indicate one or two types of RSs (e.g., two types of RSs for FR2), and may indicate a QCL Type respectively corresponding to each of the types of RSs. Table 1 illustrates an example of TCI state configuration information.

TABLE 1

| TCI State ID | DL RS1 | QCL-Type1 | DL RS2 | QCL-Type2 |
|---|---|---|---|---|
| 1 | SS/PBCH in one frequency | 'QCL-TypeC' | SS/PBCH in one frequency | 'QCL-TypeD' |
| 2 | SS/PBCH in one frequency | 'QCL-TypeC' | Lean SSB | 'QCL-TypeD' |
| 3 | TRS | 'QCL-TypeA' | CSI-RS for management | 'QCL-TypeD' |

Thus, when the UE 604 receives the QCL relationship information 624 indicating a TCI state ID, the UE 604 may access a table (e.g., similar to Table 1) and identify the row corresponding to the indicated TCI state ID. The UE 604 may then identify 628 the QCL relationship by identifying the QCL Type(s) and pilot signal(s) (or RS(s)) corresponding to the indicated TCI state ID.

By way of a first illustration, the base station 602 may transmit QCL relationship information 624 that indicates a TCI state ID of "1." When the UE 604 receives the QCL relationship information indicating the TCI state ID of "1," the UE 604 may determine that the TCI state ID of "1" corresponds to QCL Type C for an SS/PBCH block in one frequency and QCL Type D for the SS/PBCH block in one frequency. Therefore, the UE 604 may determine that the QCL relationship associated with the at least one periodic lean SSB includes the parameters of Doppler shift and average delay for QCL Type C and RX spatial information for QCL Type D that are shared with an SS/PBCH block in one frequency.

By way of a second illustration, the base station 602 may transmit QCL relationship information 624 that indicates a TCI state ID of "2." When the UE 604 receives the QCL relationship information indicating the TCI state ID of "2," the UE 604 may determine that the TCI state ID of "2" corresponds to QCL Type C for an SS/PBCH block in one frequency and QCL Type D for another lean SSB (e.g., a lean SSB of another set and/or in another narrow BWP). Therefore, the UE 604 may determine that the QCL relationship associated with the at least one periodic lean SSB includes the parameters of Doppler shift and average delay shared with an SS/PBCH block in one frequency (e.g., for QCL Type C), and includes the parameter of RX spatial information shared with another lean SSB (e.g., for QCL Type D).

In another aspect, the base station 602 may explicitly indicate (e.g., configure and/or modify) the QCL relationship to the UE 604 by transmitting at least one of a SIB, an RRC signaling message, a MAC control element (CE), and/or DCI message that indicates the QCL relationship information 624. The base station 602 may indicate, in the QCL relationship information 624, a mapping of the at least one pilot signal in at least a first BWP to the at least one periodic lean SSB in at least a second BWP for at least one of QCL Type C and/or QCL Type D.

Figure 7:
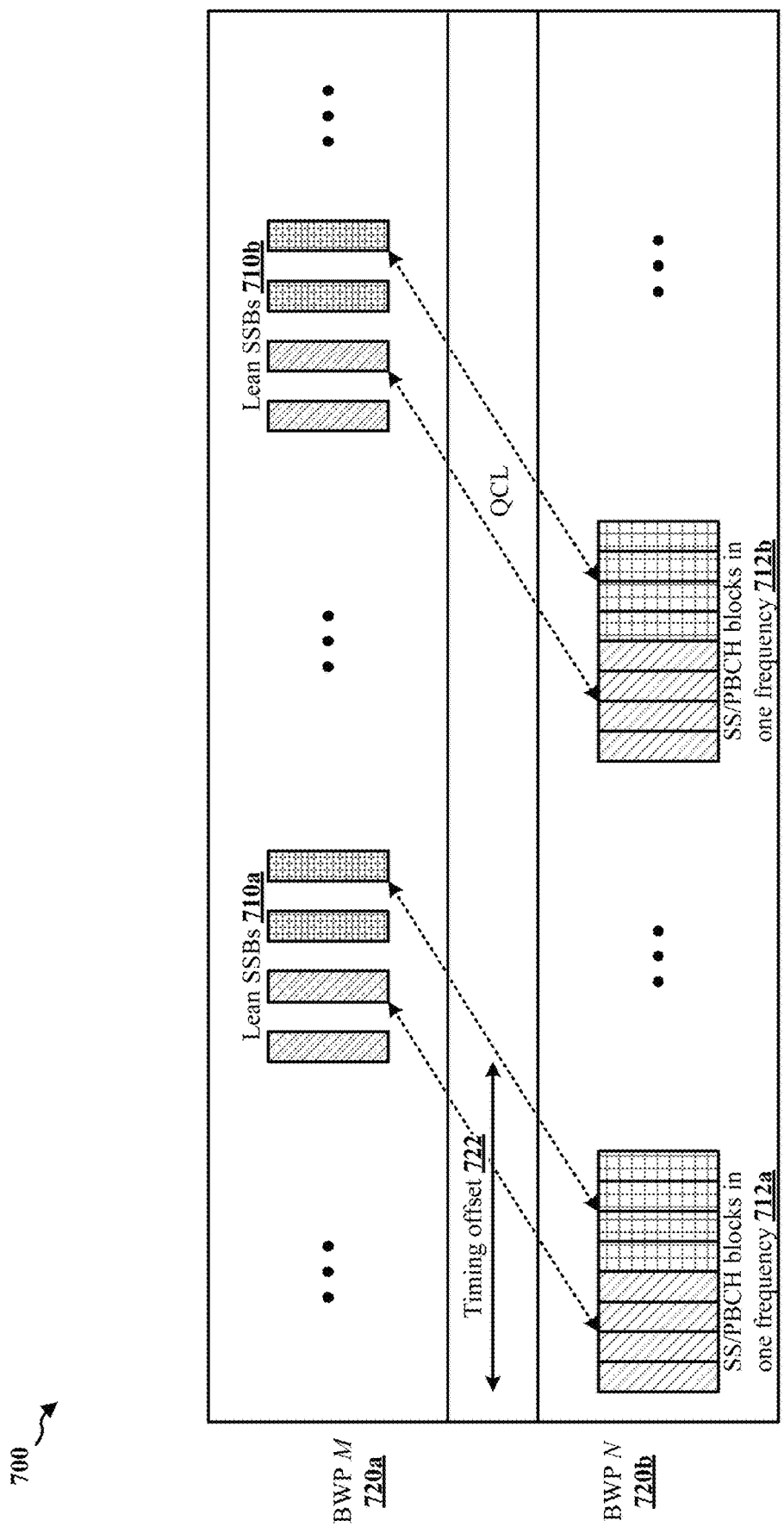
FIG. 7 is a diagram illustrating an example quasi-collocation (QCL) relationship between a periodic lean SSB and an SSB in one frequency.

Referring to FIG. 7, a diagram illustrates an example of a QCL relationship 700 that includes a mapping between at least one pilot signal in at least a first BWP and at least one periodic lean SSB in at least a second BWP for at least one of QCL Type C and/or QCL Type D. In the example QCL relationship 700, the at least one pilot signal may include SS/PBCH blocks 712a-b in one frequency, which may be carried in at least BWP N 720b.

Each of the SS/PBCH blocks 712a-b in BWP N 720b may be mapped to a respective one of the periodic lean SSBs 710a-b in BWP M 720a by a timing offset 722. That is, the base station 602 may determine the QCL relationship for the periodic lean SSBs 710a-b includes a mapping in time for QCL Type C and/or QCL Type D from one of the SS/PBCH blocks 712a-b in one frequency to one of the periodic lean SSBs 710a-b that is respectively separated in time therefrom by the timing offset 722.

Correspondingly, the UE 604 may identify 628 the QCL relationship associated with receiving each of the periodic lean SSBs 710a-b in BWP M 720a includes at least one of: (1) for QCL Type C, the parameters of Doppler shift and average delay shared with one of the SS/PBCH blocks 712a-b in one frequency offset earlier in time by the timing offset 722; and/or (2) for QCL Type D, the parameter of RX spatial information shared with one of the SS/PBCH blocks 712a-b in one frequency offset earlier in time by the timing offset 722.

In some aspects, BWP M 720a and BWP N 720b may be the same BWP. In some other aspects, the base station 602 may transmit the SS/PBCH blocks 712a-b in more than one BWP. For example, the base station 602 may transmit the SS/PBCH blocks 712a-b in all BWP configured for the UE 604.

Illustratively, the base station 602 may configure the UE 604 with explicit QCL relationship information 624 to identify 628 the QCL relationship associated with the at least one periodic lean SSB includes QCL Types C and D associated with one of the SS/PBCH blocks 712a-b offset earlier in time by the timing offset 722. When the UE 604 receives one of the SS/PBCH blocks 712a-b in at least BWP N 720b, the UE 604 may apply the Doppler shift, average delay, and RX spatial information determined from receiving that one of the SS/PBCH blocks 712a-b in order to receive one of the periodic lean SSBs 710a-b in at least BWP M 720a after the timing offset 722.

The base station 602 may transmit the QCL relationship information 624 to explicitly indicate the mapping from the at least one pilot signal in at least one first BWP (e.g., the SS/PBCH blocks 712a-b in one frequency) to the at least one periodic lean SSB in at least one second BWP (e.g., the periodic lean SSBs 710a-b) in one of a SIB, RRC signaling message, MAC CE, and/or DCI message. The base station 602 may indicate the signals to be used for the mapping, the timing offset, the at least one first BWP, and/or other information associated with the QCL relationship in the QCL relationship information 624.

In one aspect, the base station 602 may configure the mapping from the at least one pilot signal in at least one first BWP to the at least one periodic lean SSB in at least one second BWP as a mapping of the at least one pilot signal in a period to one of the at least one periodic lean SSBs in a period—e.g., one of the first-period SS/PBCH blocks 712a in one frequency may be mapped to one of the first-period periodic lean SSBs 710a by the timing offset 722. In another aspect, the base station 602 may configure the mapping from the at least one pilot signal in at least one first BWP to the at least one periodic lean SSB in at least one second BWP as a mapping of a plurality of the at least one pilot signal in one period to one of the at least one periodic lean SSBs in one period—e.g., each of the first-period SS/PBCH blocks 712a in one frequency may be mapped to one of the first-period periodic lean SSBs 710a. In still another aspect, the base station 602 may configure the mapping from the at least one pilot signal in at least one first BWP to the at least one periodic lean SSB in at least one second BWP as a mapping of one of the at least one pilot signal in one period to a plurality of the at least one periodic lean SSBs in one period—e.g., the one of the first-period SS/PBCH blocks 712*a* in one frequency may be mapped to each of the first-period periodic lean SSBs 710*a*.

According to various aspects, the periodicity of the at least one pilot signal may be the same as or may be different from the periodicity of the at least one periodic lean SSB. For example, the periodicity of the SS/PBCH blocks 712*a-b* in one frequency may be the same as or may be different from the periodicity of the periodic lean SSBs 710*a-b*. When the periodicities of the at least one pilot signal and the at least one periodic lean SSB are different, then the mapping between the at least one pilot signal in at least the first BWP and the at least one periodic lean SSB in at least the second BWP may be a mapping between a first one of the at least one pilot signal in one period and a first one of the at least one periodic lean SSB in one period. For example, when the periodicities of the SS/PBCH blocks 712*a-b* in one frequency and the periodic lean SSBs 710*a-b* are different, the mapping may be configured between a first SS/PBCH block of the first-period SS/PBCH blocks 712*a* and a first periodic lean SSB of the first-period periodic lean SSBs 710*a* and, further, may be configured between a first SS/PBCH block of the second-period SS/PBCH blocks 712*b* and a first periodic lean SSB of the second-period periodic lean SSBs 710*b*.

Referring again to FIG. 6, the base station 602 may implicitly indicate the QCL relationship to the UE 604 in some other aspects. Thus, the QCL relationship information 624 may be implicitly signaling in some other aspects, and the UE 604 may be configured to identify 628 the QCL relationship associated with the at least one periodic lean SSB based on the implicit QCL relationship information 624.

Figure 8:
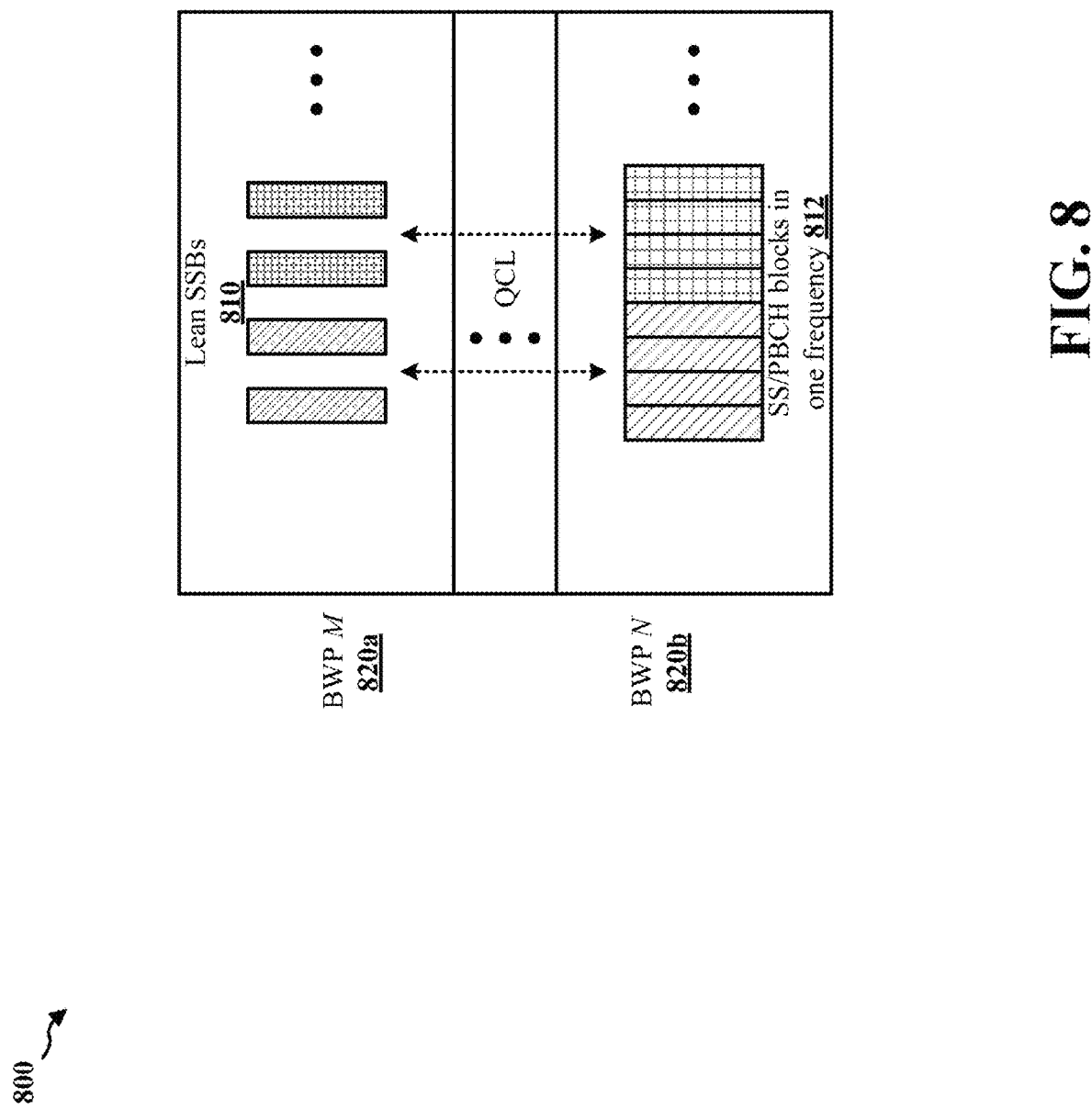
FIG. 8 is a diagram illustrating another example QCL relationship between a periodic lean SSB and an SSB in one frequency.

In the context of FIG. 8, a diagram illustrates an example configuration 800 for an implicitly indicated QCL relationship between a periodic lean SSB and an SSB/PBCH block in one frequency. According to the example configuration 800, the UE 604 may identify 628 the QCL relationship associated with at least one periodic lean SSB based on implicit QCL relationship information 624 that is received from the base station 602. In particular, the UE 604 may identify 628 the QCL relationship associated with the periodic lean SSB as one including QCL Type C and/or QCL Type D with at least one pilot signal when the at least one periodic lean SSB overlaps in time with the at least one pilot signal. Thus, the implicit QCL relationship information 624 may include at least one pilot signal that at least partially overlaps with the at least one periodic lean SSB.

Illustratively, periodic lean SSBs 810 in at least BWP M 820*a* may at least partially overlap in time with SS/PBCH blocks 812 in one frequency in at least BWP N 820*b*. Thus, when the base station 602 configures 622 the QCL relationship to include QCL Type C and/or Type D with SS/PBCH blocks in one frequency, the base station 602 may contemporaneously transmit a period of the SS/PBCH blocks 812 in one frequency and a period of the periodic lean SSBs 810. Correspondingly, each of the symbols of the periodic lean SSBs 810 will overlap with one symbol of the SS/PBCH blocks 812 in one frequency.

Correspondingly, the UE 604 may receive the SS/PBCH blocks 812 in one frequency in at least BWP N 820*b* and, contemporaneously, the UE 604 may detect the periodic lean SSBs 810 on symbols overlapping with those of the SS/PBCH blocks 812 in one frequency. When the UE 604 detects the periodic lean SSBs 810 on the symbols overlapping with the SS/PBCH blocks 812, the UE 604 may identify 628 the QCL relationship associated with the periodic lean SSBs 810 includes QCL Type C and/or QCL Type D with the SS/PBCH blocks 812 in one frequency.

Accordingly, the UE 604 may determine that periodic lean SSBs 810 in BWP M 820*a* share a Doppler shift and average delay with SS/PBCH blocks 812 in one frequency for QCL Type C and/or share RX spatial information with SS/PBCH blocks 812 in one frequency for QCL Type D when the UE 604 determines that the periodic lean SSBs 810 in at least BWP M 820*a* overlap in time with SS/PBCH blocks 812 in one frequency in at least BWP N 820*b*.

In some aspects, BWP M 820*a* and BWP N 820*b* may be the same BWP. In some other aspects, the base station 602 may transmit the SS/PBCH blocks 812 in more than one BWP. For example, the base station 602 may transmit the SS/PBCH blocks 812 in all BWP configured for the UE 604.

Again with reference to FIG. 6, the UE 604 may apply a set of parameters associated with the QCL relationship to receive subsequent periodic transmissions of the lean SSB once the UE 604 has determined the QCL relationship associated with the at least one periodic lean SSB. For example, the base station 602 may transmit at least one pilot signal 630, e.g., in at least one BWP. As described, supra, the at least one pilot signal 630 may be at least one SS/PBCH block in one frequency, at least one CSI-RS, at least one TRS, and/or at least one other periodic lean SSB (e.g., a periodic lean SSB of another set).

In addition, the base station 602 may transmit at least one periodic lean SSB 634. Potentially, the base station 602 may transmit the at least one periodic lean SSB 634 based on the QCL relationship between the at least one pilot signal 630 and the at least one periodic lean SSB, e.g., such that symbols of the at least one pilot signal 630 conveyed from one antenna port at the base station 602 experience similar channel conditions as symbols of the at least one periodic lean SSB 634 conveyed from another antenna port when transmitted to the UE 604.

The UE 604 may receive the at least one pilot signal 630 from the base station 602 and, based thereon, may determine 632 a set of parameters associated with the QCL relationship. The set of parameters may include one or more of the Doppler shift, Doppler spread, delay spread, average delay, and/or RX spatial information. For example, the UE 604 may determine the QCL relationship includes QCL Type C and/or QCL Type D with the at least one pilot signal 630, and therefore, the UE 604 may determine 632 the set of parameters to include: (1) the Doppler shift and average delay, and/or (2) RX spatial information.

The UE 604 may determine other parameters for receiving the at least one periodic lean SSB 634 based on explicit signaling received from the base station 602 or the UE 604 may independently determine the other parameters (e.g., Doppler shift, Doppler spread, average delay, and/or delay spread) by independently tracking and measuring the at least one periodic lean SSB 634 without any QCL relationship information.

Subsequently, the UE 604 may apply 636 the determined set of parameters in order to receive the at least one periodic lean SSB 634. For example, the UE 604 may apply the Doppler shift and average delay determined from the at least one pilot signal 630 and/or may apply the RX spatial information determined from the at least one pilot signal 630 in order to receive the at least one periodic lean SSB 634 without performing at least some tracking and measurements commensurate with signal reception on the at least one periodic lean SSB 634.

In some aspects, the UE 604 may apply the determined set of parameters by evaluating a formula having at least one variable corresponding to at least one of the Doppler shift, Doppler spread, average delay, delay spread, and/or RX spatial information. The UE 604 may then receive the at least one periodic lean SSB 634 based on evaluating the formula according to the set of parameters determined by the UE 604 based on receiving the at least one pilot signal 630. For example, the UE 604 may configure, based on evaluating the at least one formula, a precoder, beamforming weights, antenna coefficients, direction and/or directivity, port, RX chain, and/or another setting or parameter that is configurable by the UE 604.

Figure 9:
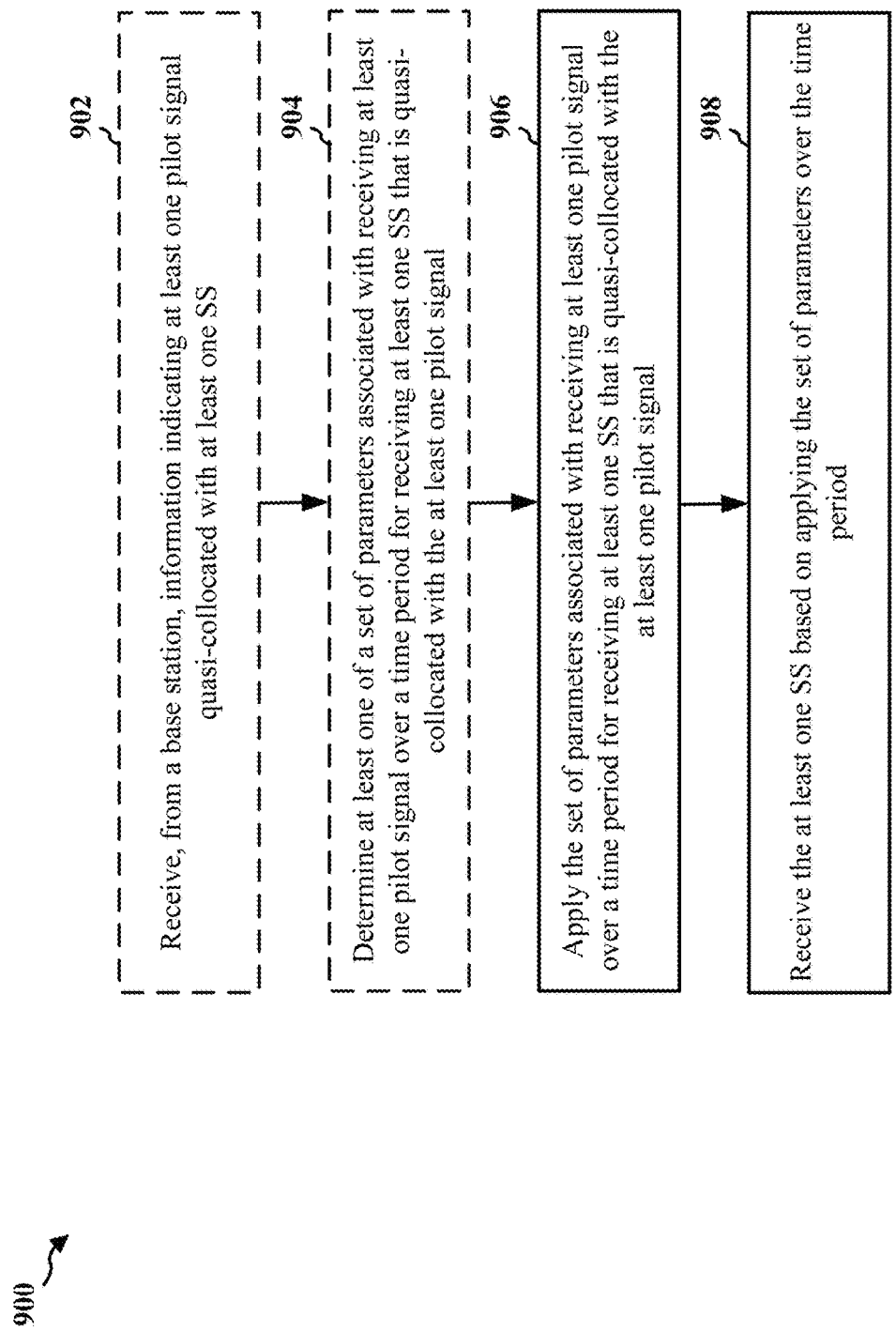
FIG. 9 is a flowchart of a method of wireless communication by a UE.

FIG. 9 is a flowchart of a method 900 of wireless communication. The method 900 may be performed by or at a UE (e.g., the UE 104, 350, 604), an apparatus (e.g., the apparatus 1102), or one or more components thereof. According to different aspects, one or more of the illustrated operations may be omitted, transposed, and/or contemporaneously performed.

At 902, the UE may receive, from a base station, information indicating at least one pilot signal quasi-collocated with at least one SS. The at least one SS may be a periodic lean SSB. The UE may determine a QCL relationship associated with the at least one SS based on the received information. In some aspects, the QCL relationship may be associated with at least one of a Doppler shift and an average delay for QCL Type C and/or may be associated with RX spatial information for the QCL Type D. In some other aspects, the QCL relationship may be associated with at least one of a Doppler shift, a Doppler spread, an average delay, or a delay spread that is explicitly signaled from a base station. In still other aspects, the periodic single-symbol SS is associated with at least one of a Doppler shift, a Doppler spread, an average delay, or a delay spread that is absent from the QCL relationship. Referring to FIG. 6, for example, the UE 604 may receive QCL relationship information 624 from the base station 602. The UE 604 may identify 628 a QCL relationship between at least one pilot signal 630 and at least one periodic lean SSB 634 based on the information 624 received from the base station 602.

In some aspects, the base station may explicitly indicate the QCL relationship to the UE, and therefore, the UE may receive information explicitly indicating the QCL relationship from the base station. For example, the information indicating the QCL relationship may include a TCI state ID, and the base station may explicitly indicate the QCL relationship to the UE by transmitting information indicating a TCI state ID to the UE that corresponds to a type of the at least one pilot signal associated with the QCL relationship and a type of the QCL relationship (e.g., QCL Type C and/or QCL Type D).

In another example, the information explicitly indicating the QCL relationship may include information indicating a mapping of at least one pilot signal in at least a first BWP to the at least one periodic single-symbol SS in at least a second BWP for at least one of QCL Type C and/or QCL Type D. In various aspects, the information mapping the at least one pilot signal in at least the first BWP to the at least one periodic single-symbol SS in at least the second BWP includes one of: information mapping one of the at least one pilot signal in at least the first BWP to one of the at least one periodic single-symbol SS in at least the second BWP, information mapping a plurality of the at least one pilot signal in at least the first BWP to one of the at least one periodic single-symbol SS in at least the second BWP, and/or information mapping one of the at least one pilot signal in at least the first BWP to a plurality of the at least one periodic single-symbol SS in at least the second BWP.

Potentially, the information mapping the at least one pilot signal in at least the first BWP to the at least one periodic single-symbol SS in at least the second BWP part for the at least one of QCL Type C or QCL Type D may be transmitted to the UE in at least one of a SIB, RRC signaling message, MAC CE, and/or DCI message.

In some other aspects, the information may be implicitly indicated to the UE, and the UE may derive the QCL relationship based on implicit information received from the base station. For example, the UE may detect that at least one pilot signal in at least a first BWP overlaps in time with the at least one periodic single-symbol SS in at least a second BWP. The UE may then determine the QCL relationship associated with the periodic single-symbol SS by determining the QCL relationship associated with the periodic single-symbol SS corresponds to the at least one pilot signal for at least one of QCL Type C or QCL Type D when the at least one pilot signal in at least the first BWP overlaps in time with the at least one periodic single-symbol SS in at least the second BWP. For example, the UE may measure at least one of a Doppler shift, Doppler spread, average delay, or delay spread based on receiving the at least one pilot signal, and the UE may apply the measured at least one of the Doppler shift, Doppler spread, average delay, or delay spread for receiving the at least one pilot signal to receiving the at least one periodic single-symbol SS, e.g., by tuning antenna element(s) and/or other circuitry.

At 904, the UE may determine at least one of a set of parameters associated with receiving at least one pilot signal. To determine the at least one of the set of parameters associated with receiving the at least one pilot signal—e.g., in order to apply the parameter for receiving the lean SSB—the UE may receive at least one pilot signal from the base station. The at least one pilot signal may include one or more of an SS/PBCH block that includes a PSS and SSS with a PBCH, a CSI-RS, a TRS, and/or another periodic lean SSB.

In order to measure, derive, or otherwise determine the set of parameters associated with the QCL relationship between the pilot signal and the lean SSB, the UE may perform tracking and/or other measurements to determine at least a Doppler shift and/or an average delay associated with the at least one pilot signal when the QCL relationship includes QCL Type C and/or RX spatial information associated with the at least one pilot signal when the QCL relationship includes QCL Type D. In some aspects, one or more other parameters associated with the QCL relationship (e.g., Doppler shift, Doppler spread, delay shift, and/or average delay) may be explicitly signaled to the UE by the base station. In some other aspects, the one or more other parameters may be independent of those associated with the at least one pilot signal, and therefore, the UE may perform tracking and/or other measurements to determine the other parameters that are independent, unrelated, or otherwise unascertainable from the at least one pilot signal.

Referring to FIG. 6, for example, the UE 604 may receive the at least one pilot signal 630 from the base station 602, and the UE 604 may identify 628 that the at least one pilot signal 630 is quasi-collocated with at least one lean SSB that is periodically transmitted by the base station 602. Thus, the UE 604 may determine 632 the set of parameters associated with the identified QCL relationship based on receiving the at least one pilot signal 630.

At 906, the UE may apply at least one of the determined set of parameters associated with receiving the at least one pilot signal over a time period for receiving at least one SS that is quasi-collated with the at least one pilot signal. The time period may be equal to the single symbol in which the lean SSB is scheduled to be carried. The single symbol may correspond to a certain periodicity at which a similar lean SSB is transmitted, such as every x μs (e.g., for a symbol duration of 16.67 μs or similar duration) or in the $n^{th}$ symbol of every two or four slots, etc.

By way of illustration, the UE may apply the Doppler shift and average delay determined from receiving the at least one pilot signal when the QCL relationship includes QCL Type C or may apply the RX spatial information determined from receiving the at least one pilot signal when the QCL relationship includes QCL Type D. In so doing, the UE may evaluate, using at least one of the set of parameters, at least one algorithm having a set of variables corresponding to the at least one of the set of parameters. Based on the evaluation of the algorithm, the UE may obtain some information indicating an antenna configuration or tuning, e.g., through an RF chain, an analog (or digital) beamformer, etc., that the UE may assume is accurate for receiving the at least one lean SSB. The UE may then tune antenna circuitry based on the obtained information, and may refrain from tracking or measuring the lean SSB, which may be redundant given the QLC relationship between the at least one pilot signal and the at least one lean SSB.

Referring to FIG. 6, for example, the UE 604 may apply 636 the determined set of parameters in order to receive the at least one periodic lean SSB 634. For example, the UE 604 may apply the Doppler shift and average delay associated with the at least one pilot signal 630 and/or may apply the RX spatial information associated with the at least one pilot signal 630 in order to receive the at least one periodic lean SSB 634 without performing separate tracking and measurements on the at least one periodic lean SSB 634.

At 908, the UE may receive the at least one SS based on applying the set of parameters over the time period. That is, the UE may apply some configuration(s) and/or measurement(s) that the UE measured from receiving a different pilot signal, as the paths the two signals traverse over the wireless medium may be similar to a degree at which at least some information or parameters measured based on receiving the at least one pilot signal may be assumed as true for the lean SSB. The UE may detect some RF waves on at least one antenna element. The analog RF waves may be converted to digital signals and demodulated, and the UE may recover information carried in the lean SSB based on the analog-to-digital conversion, demodulation, and forth. Referring to FIG. 6, for example, the UE 604 may receive the at least one periodic lean SSB 634 from the base station 602 based on the set of parameters that is applied based on the at least one pilot signal 630.

Figure 10:
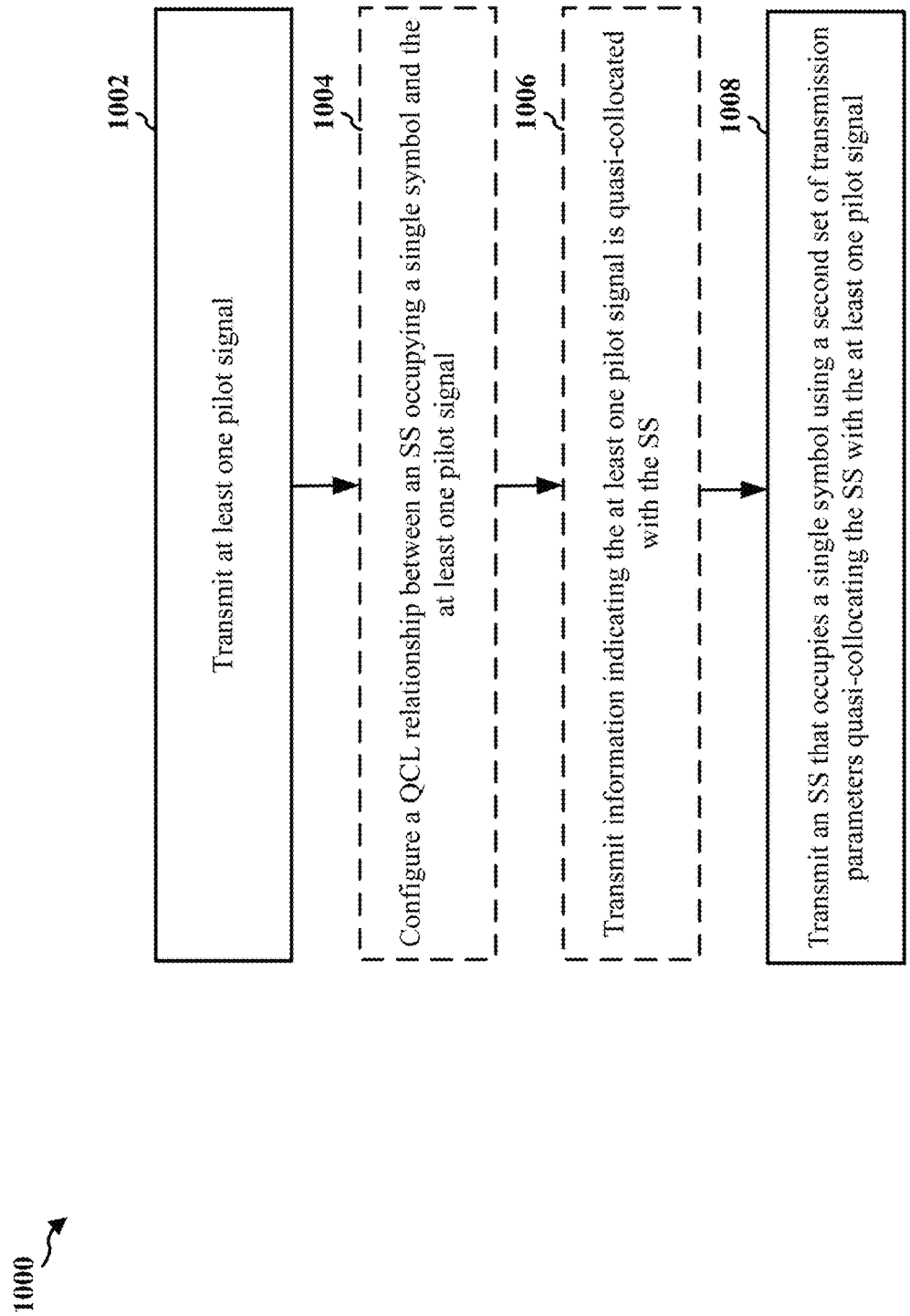
FIG. 10 is a flowchart of a method of wireless communication by a base station.

FIG. 10 is a flowchart of a method 1000 of wireless communication. The method may be performed by or at a base station (e.g., the base station 102/180, 310, 602), an apparatus (e.g., the apparatus 1202), or one or more components thereof. According to different aspects, one or more of the illustrated operations may be omitted, transposed, and/or contemporaneously performed.

At 1002, the base station may transmit at least one pilot signal. The at least one pilot signal may include one or more of an SS/PBCH block that includes a PSS and SSS with a PBCH, a CSI-RS, a TRS, and/or another periodic lean SSB. Thus, in some aspects, the base station may transmit the pilot signal to the UE (e.g., as with CSI-RS), whereas in some other aspects, the base station may transmit (e.g., broadcast or multicast) the pilot signal with the intention for the pilot signal to be received by multiple UEs. Referring to FIG. 6, for example, the base station 602 may transmit the at least one pilot signal 630. Potentially, the transmission of the pilot signal 630 may be unicast directly to the UE 604, or the transmission of the pilot signal 630 may be a general or specific broadcast or multicast, and the UE 604 may receive the pilot signal 630.

At 1004, the base station may configure a QCL relationship between an SS occupying a single symbol and the at least one pilot signal. For example, the base station may configure a set of transmission parameters to quasi-collocate an SS occupying a single symbol with the at least one pilot symbol. The SS may be intended to have at least one of a Doppler shift, average delay, or spatial parameter in common with the at least one pilot signal. For example, the base station may determine a QCL relationship between at least one pilot signal and at least one periodic single-symbol SS for a UE. Referring to FIG. 6, for example, the base station 602 may configure 632 a QCL relationship between the at least one pilot signal 630 and the at least one periodic lean SSB 634. Potentially, the base station 602 may specifically configure the QCL relationship between the at least one pilot signal and the SS for the UE 604.

In some aspects, the QCL relationship may be associated with at least one of a Doppler shift and an average delay for QCL Type C and/or may be associated with RX spatial information for the QCL Type D. In some other aspects, the QCL relationship may be associated with at least one of a Doppler shift, a Doppler spread, an average delay, or a delay spread that is explicitly signaled from a base station. In still other aspects, the periodic single-symbol SS is associated with at least one of a Doppler shift, a Doppler spread, an average delay, or a delay spread that is absent from the QCL relationship. The base station may configure or adjust circuitry and/or settings (or may refrain from doing so) in order for the SS to be quasi-collocated with the at least one pilot signal. For example, the base station may record or store the direction and directivity with which the at least one pilot signal is transmitted from antenna circuitry of the base station. The base station may tune the antenna circuitry so that the direction and directivity of signal transmission from the antenna circuitry is substantially consistent across the transmission of the at least one pilot signal and the transmission of the SSB.

At 1006, the base station may transmit information indicating the at least one pilot signal is quasi-collocated with the SS occupying the single symbol. For example, the base station may transmit information indicating the QCL relationship to the UE. Referring to FIG. 6, for example, the base station 602 may transmit the QCL relationship information 624 to the UE 604 to indicate the QCL relationship between the at least one pilot signal 630 and the at least one periodic lean SSB 634 configured 622 by the base station 602.

In some aspects, the QCL relationship may be explicitly indicated to the UE, and therefore, the UE may receive information indicating the QCL relationship from the base station. For example, the information indicating the QCL relationship may include a TCI state ID, and the UE may determine the QCL relationship by determining a type of at least one pilot signal associated with the QCL relationship and a type of the QCL relationship based on the TCI state ID.

In another example, the information explicitly indicating the QCL relationship may include information indicating a mapping of at least one pilot signal in at least a first BWP to the at least one periodic single-symbol SS in at least a second BWP for at least one of QCL Type C and/or QCL Type D. In various aspects, the information mapping the at least one pilot signal in at least the first BWP to the at least one periodic single-symbol SS in at least the second BWP includes one of: information mapping one of the at least one pilot signal in at least the first BWP to one of the at least one periodic single-symbol SS in at least the second BWP, information mapping a plurality of the at least one pilot signal in at least the first BWP to one of the at least one periodic single-symbol SS in at least the second BWP, and/or information mapping one of the at least one pilot signal in at least the first BWP to a plurality of the at least one periodic single-symbol SS in at least the second BWP.

Potentially, the information mapping the at least one pilot signal in at least the first BWP to the at least one periodic single-symbol SS in at least the second BWP part for the at least one of QCL Type C or QCL Type D may be transmitted to the UE in at least one of a SIB, RRC signaling message, MAC CE, and/or DCI message. In some other aspects, the base station may implicitly indicate the QCL relationship to the UE. For example, the base station may implicitly indicate the QCL relationship to the UE by transmitting the at least one pilot signal in at least a first BWP overlapping in time with the at least one periodic single-symbol SS in at least a second BWP.

At 1008, the base station may transmit an SS that occupies a single symbol using a second set of transmission parameters quasi-collocating the SS with the at least one pilot signal. That is, the base station may transmit the at least one periodic single-symbol SS to the UE based on the configured QCL relationship. For example, the base station may transmit the at least one periodic single-symbol SS to the UE based on at least a Doppler shift and an average delay associated with the at least one pilot signal when the QCL relationship includes QCL Type C and/or at least UE RX spatial information associated with the at least one pilot signal when the QCL relationship includes QCL Type D. In some aspects, one or more other parameters associated with the QCL relationship (e.g., Doppler shift, Doppler spread, delay shift, and/or average delay) may be explicitly signaled to the UE by the base station. In some other aspects, the one or more other parameters may be independent of those associated with the at least one pilot signal, and therefore, the transmit the at least one periodic single-symbol SS to the UE independent of those other parameters associated with the at least one pilot signal. Referring to FIG. 6, for example, the base station 602 may transmit the at least one periodic lean SSB 634 to the UE 604 based on the QCL relationship configured 622 by the base station 602.

Figure 11:
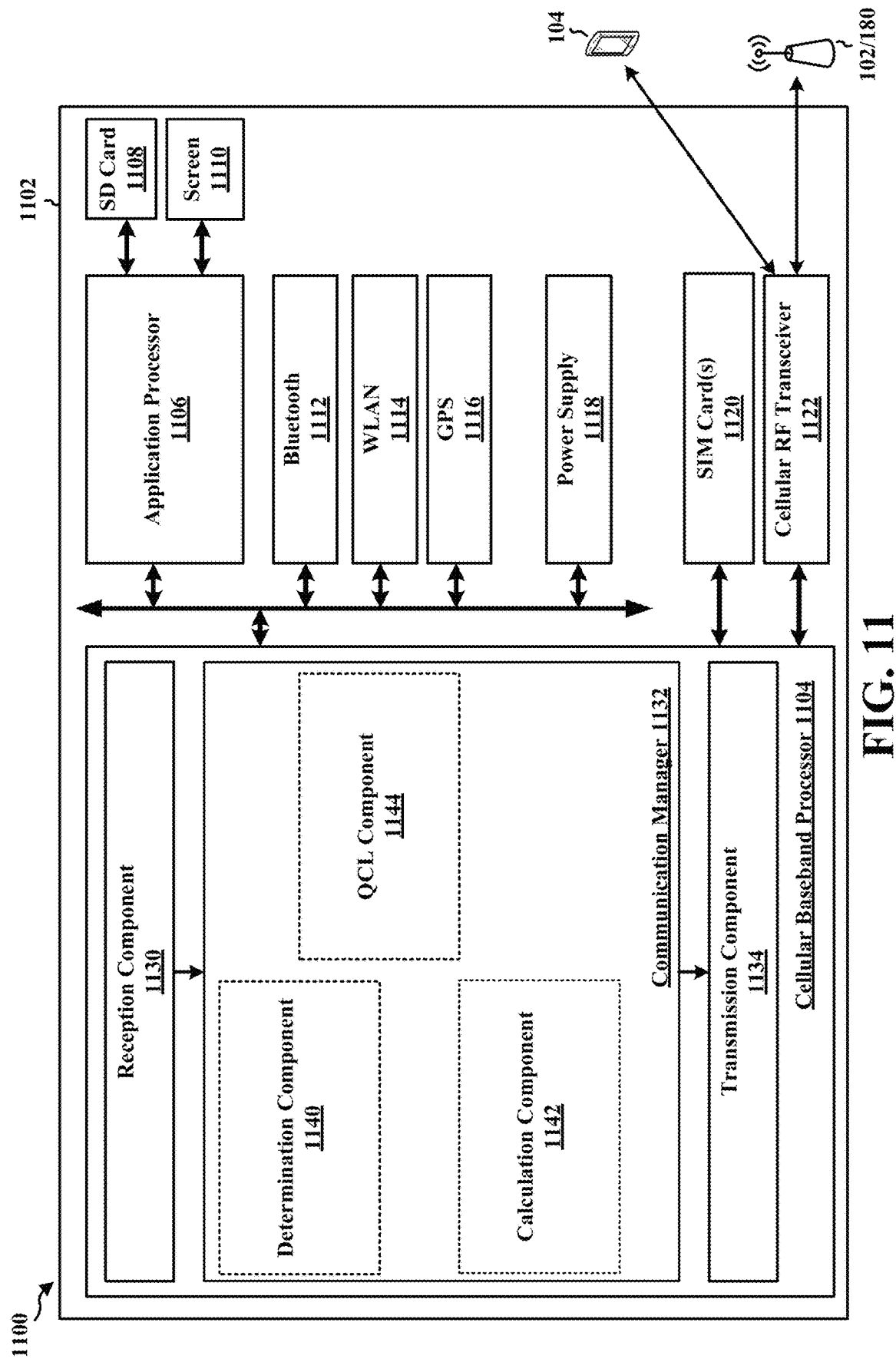
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE or similar device, or the apparatus 1102 may be a component of a UE or similar device. The apparatus 1102 may include a cellular baseband processor 1104 (also referred to as a modem) and/or a cellular RF transceiver 1122, which may be coupled together and/or integrated into the same package or module.

In some aspects, the apparatus 1102 may accept or may include one or more subscriber identity modules (SIM) cards 1120, which may include one or more integrated circuits, chips, or similar circuitry, and which may be removable or embedded. The one or more SIM cards 1120 may carry identification and/or authentication information, such as an international mobile subscriber identity (IMSI) and/or IMSI-related key(s). Further, the apparatus 1102 may include one or more of an application processor 1106 coupled to a secure digital (SD) card 1108 and a screen 1110, a Bluetooth module 1112, a wireless local area network (WLAN) module 1114, a Global Positioning System (GPS) module 1116, and/or a power supply 1118.

The cellular baseband processor 1104 communicates through the cellular RF transceiver 1122 with the base station 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104.

In the context of FIG. 3, the cellular baseband processor 1104 may be a component of the UE 350 and may include the memory 360 and/or at least one of the TX processor 368, the RX processor 356, and/or the controller/processor 359. In one configuration, the apparatus 1102 may be a modem chip and/or may be implemented as the baseband processor 1104, while in another configuration, the apparatus 1102 may be the entire UE (e.g., the UE 350 of FIG. 3) and may include some or all of the abovementioned modules, components, and/or circuitry illustrated in the context of the apparatus 1102. In one configuration, the cellular RF transceiver 1122 may be implemented as at least one of the transmitter 354TX and/or the receiver 354RX.

The reception component 1130 may be configured to receive signaling on a wireless channel, such as signaling from a base station 102/180. The transmission component 1134 may be configured to transmit signaling on a wireless channel, such as signaling to a base station 102/180. The communication manager 1132 may coordinate or manage some or all wireless communications by the apparatus 1102, including across the reception component 1130 and the transmission component 1134.

The reception component 1130 may provide some or all data and/or control information included in received signaling to the communication manager 1132, and the communication manager 1132 may generate and provide some or all of the data and/or control information to be included in transmitted signaling to the transmission component 1134. The communication manager 1132 may include the at least a determination component 1140, a calculation component 1142, and a QCL component 1144, one or more of which may be configured to process received data and/or control information, and/or generate data and/or control information for transmission.

The reception component 1130 may be configured to receive, from the base station 102/180, information indicating at least one pilot signal is quasi-collocated with at least one SS, e.g., as described in connection with 902 of FIG. 9. The at least one pilot signal may include at least one of an SS/PBCH block, a CSI-RS, or a TRS. The at least one SS may include a single-symbol PSS or a single-symbol SSS. In some aspects, the information indicating the at least one pilot signal is quasi-collocated with the at least one SS comprises at least one of a QCL Type or a TCI state ID associated with transmission of the at least one pilot signal by the base station 102/180. In some other aspects, the information indicating the at least one pilot signal is quasi-collocated with the at least one SS comprises a mapping of at least one location of the at least one pilot signal in a first BWP to at least one other location of the at least one SS in at least one other BWP.

The determination component 1140 may be configured to determine at least one of the set of parameters associated with receiving the at least one pilot signal over a time period for receiving at least one SS that is quasi-collocated with the at least one pilot signal, e.g., as described in connection with 904 of FIG. 9. For example, the determination component 1140 may identify the type of pilot signal that is quasi-collocated with the at least one SS, and further, may identify the manner in which the signals are quasi-collocated—e.g., whether the signals are quasi-collocated with respect to Doppler shift, average delay, RX spatial parameter, or another parameter.

The calculation component 1142 may be configured to calculate at least one of a Doppler shift, a Doppler spread, a delay shift, or an average delay based on receiving the at least one pilot signal. For example, the calculation component 1142 may receive the at least one pilot signal, and then the calculation component 1142 may measure the Doppler spread, delay shift, dominant AoA, average AoA, or another value. The determination component 1140 may determine a value of one or more of the parameters based on the calculated at least one of the Doppler shift, Doppler spread, delay shift, average delay, or spatial (RX) parameter.

The QCL component 1144 may be configured to apply a set of parameters associated with receiving at least one pilot signal over a time period for receiving at least one SS that is quasi-collocated with the at least one pilot signal, e.g., as described in connection with 906 of FIG. 9. The time period may correspond with a periodicity of SS transmission. In some aspects, the time period for receiving the at least one SS at least partially overlaps with at least one symbol that includes the at least one pilot signal. In some further aspects, the set of parameters is applied based on the time period for receiving the at least one SS at least partially overlapping with the at least one symbol that includes the at least one pilot signal.

The application of the set of parameters may configure the reception component 1130 to receive in a certain direction (e.g., with a certain antenna directivity). The reception component 1130 may be configured to receive the at least one SS based on applying the set of parameters over the time period, e.g., as described in connection with 908 of FIG. 9.

The apparatus 1102 may include additional components that perform some or all of the blocks, operations, signaling, etc. of the algorithm(s) in the aforementioned call flow diagram and/or flowchart of FIGS. 6 and 9. As such, some or all of the blocks, operations, signaling, etc. in the aforementioned call flow diagram and/or flowchart of FIGS. 6 and 9 may be performed by a component and the apparatus 1102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for applying a set of parameters associated with receiving at least one pilot signal over a time period for receiving at least one SS that is quasi-collocated with the at least one pilot signal; and means for receiving the at least one SS based on applying the set of parameters over the time period.

In one configuration, the set of parameters includes at least one of a Doppler shift, an average delay, or a RX spatial parameter.

In one configuration, the at least one pilot signal includes an SS/PBCH block, a CSI-RS, or a TRS.

In one configuration, the time period corresponds with a periodicity of SS transmission.

In one configuration, each of the at least one SS includes a single-symbol PSS or a single-symbol SSS.

In one configuration, the apparatus 1102, and in particular the cellular baseband processor 1104, includes means for receiving, from a base station, information indicating the at least one pilot signal is quasi-collocated with the at least one SS; and means for determining at least one of the set of parameters based on the information.

In one configuration, the information indicating the at least one pilot signal is quasi-collocated with the at least one SS includes at least one of a QCL type or a TCI state ID associated with transmission of the at least one pilot signal by the base station.

In one configuration, the information indicating the at least one pilot signal is quasi-collocated with the at least one SS includes a mapping of at least one location of the at least one pilot signal in a first BWP to at least one other location of the at least one SS in at least one other BWP.

In one configuration, the apparatus 1102, and in particular the cellular baseband processor 1104, includes means for calculating at least one of a Doppler shift, a Doppler spread, a delay shift, an average delay, or a spatial parameter based on receiving the at least one pilot signal, and at least one of the set of parameters is based on the calculated at least one of the Doppler shift, the Doppler spread, the delay shift, or the average delay.

In one configuration, the time period for receiving the at least one SS at least partially overlaps with at least one symbol that includes the at least one pilot signal.

In one configuration, the set of parameters is applied based on the time period for receiving the at least one SS at least partially overlapping with the at least one symbol that includes the at least one pilot signal.

The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
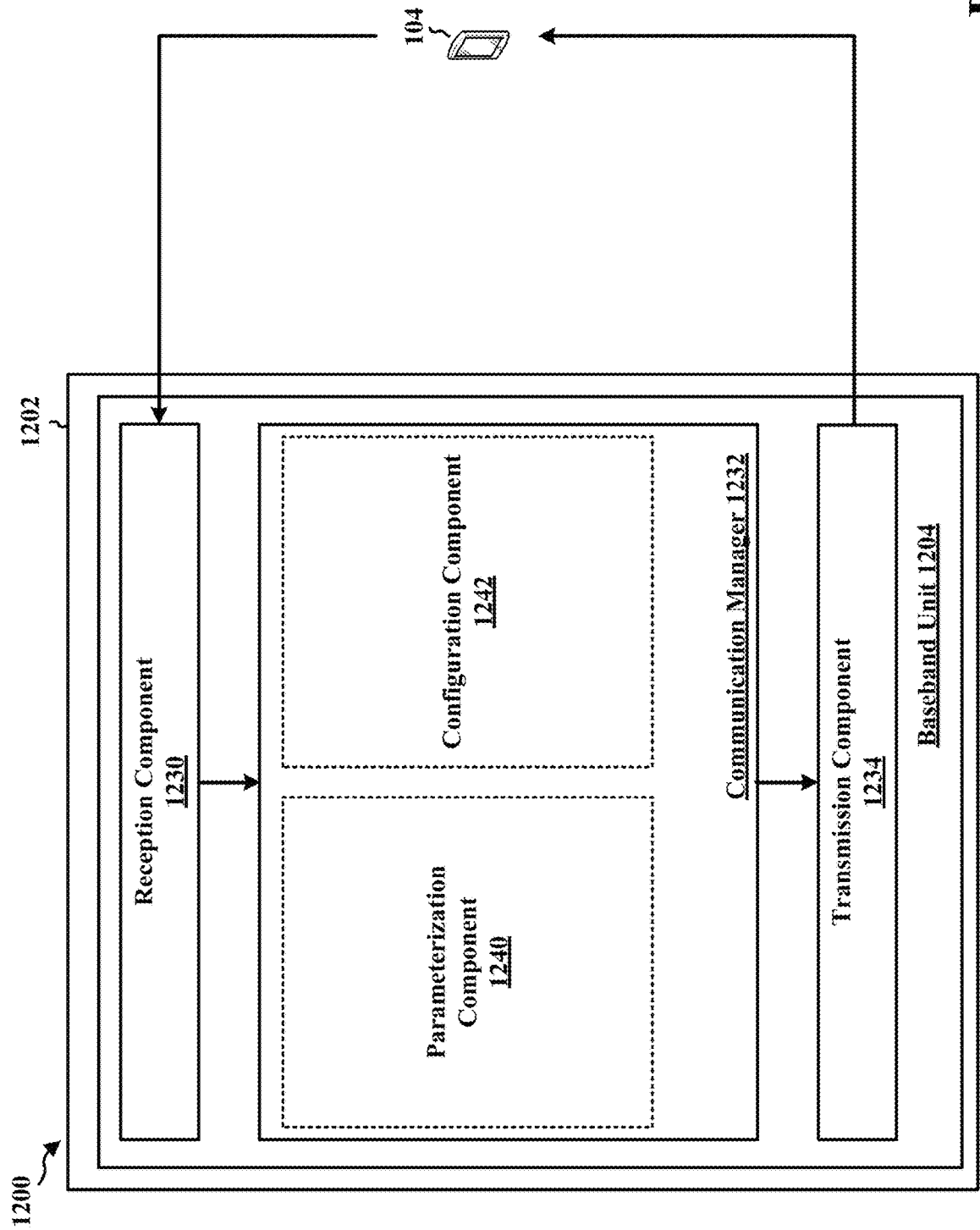
FIG. 12 is a diagram illustrating another example of a hardware implementation for another example apparatus.

FIG. 12 is a diagram 1200 illustrating an example of a hardware implementation for an apparatus 1202. The apparatus 1202 may be a base station or similar device or system, or the apparatus 1202 may be a component of a base station or similar device or system. The apparatus 1202 may include a baseband unit 1204. The baseband unit 1204 may communicate through a cellular RF transceiver. For example, the baseband unit 1204 may communicate through a cellular RF transceiver with a UE 104, such as for downlink and/or uplink communication, and/or with a base station 102/180, such as for IAB.

The baseband unit 1204 may include a computer-readable medium/memory, which may be non-transitory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The reception component 1230 may be configured to receive signaling on a wireless channel, such as signaling from a UE 104 or base station 102/180. The transmission component 1234 may be configured to transmit signaling on a wireless channel, such as signaling to a UE 104 or base station 102/180. The communication manager 1232 may coordinate or manage some or all wireless communications by the apparatus 1202, including across the reception component 1230 and the transmission component 1234.

The reception component 1230 may provide some or all data and/or control information included in received signaling to the communication manager 1232, and the communication manager 1232 may generate and provide some or all of the data and/or control information to be included in transmitted signaling to the transmission component 1234. The communication manager 1232 may include a at least a parameterization component 1240 and a configuration component 1242, including one or more of which may be configured to process received data and/or control information, and/or to generate data and/or control information for transmission. In some aspects, the generation of data and/or control information may include packetizing or otherwise reformatting data and/or control information received from a core network, such as the core network 190 or the EPC 160, for transmission.

The parameterization component 1240 may be configured to select and apply a first set of transmission parameters for transmission of at least one pilot signal using the first set of transmission parameters. The transmission component 1234 may be configured to transmit at least one pilot signal using a first set of transmission parameters, e.g., as described in connection with 1002 of FIG. 10. The at least one pilot signal may include an SS/PBCH block, a CSI-RS, or a TRS.

The configuration component 1242 may configure a second set of transmission parameters to quasi-collocate an SS with the at least one pilot signal, the SS having at least one of a Doppler shift, average delay, or spatial parameter in common with the at least one pilot signal, e.g., as described in connection with 1004 of FIG. 10. The SS may be a single-symbol PSS or a single-symbol SSS.

In some aspects, the configuration component 1242 may generate information indicating that the SS is collocated with the at least one pilot signal may include at least one of a QCL Type or a TCI state ID associated with transmission of the at least one pilot signal. In some other aspects, the configuration component 1242 may the information indicating the SS is quasi-collocated with the at least one pilot signal comprises a mapping of at least one location of the at least one pilot signal in a first BWP to another location of the in at least one other BWP. In some aspects, the SS may be scheduled in a single symbol that at least partially overlaps with at least another symbol that includes the at least one pilot signal.

The transmission component 1234 may be configured to transmit some or all of the information indicating the SS is quasi-collocated with the at least one pilot signal, e.g., as described in connection with 1006 of FIG. 10.

The transmission component 1234 may be further configured to transmit at least one SS that occupies a single symbol using a second set of transmission parameters quasi-collocating the SS with the at least one pilot signal, e.g., as described in connection with 1008 of FIG. 10. In some aspects, a plurality of single-symbol SSs may be transmitted, and the transmission component 1234 may be configured to transmit each of the plurality of SSs in a different single symbol of a same slot. Potentially, a first SS of the plurality of SSs in one symbol of the same slot is quasi-collocated with one pilot signal of the least one pilot signal, and a second SS of the plurality of SSs in another symbol of the same slot is quasi-collocated with another pilot signal of the at least one pilot signal.

The apparatus 1202 may include additional components that perform some or all of the blocks, operations, signaling, etc. of the algorithm(s) in the aforementioned call flow diagram and/or flowchart of FIGS. 6 and 10. As such, some or all of the blocks, operations, signaling, etc. in the aforementioned call flow diagram and/or flowchart of FIGS. 6 and 10 may be performed by a component and the apparatus 1202 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for transmitting at least one pilot signal using a first set of transmission parameters; and means for transmitting an SS that occupies a single symbol using a second set of transmission parameters quasi-collocating the SS with the at least one pilot signal.

In one configuration, the apparatus 1202, and in particular the baseband unit 1204, includes means for configuring the second set of transmission parameters to quasi-collocate the SS with the at least one pilot signal, the SS having at least one of a Doppler shift, average delay, or spatial parameter in common with the at least one pilot signal.

In one configuration, the at least one pilot signal includes an SS/PBCH block, a CSI-RS, or a TRS.

In one configuration, the means for transmitting the SS that occupies the single symbol is configured to transmit each of a plurality of SSs in a different single symbol of a same slot.

In one configuration, a first SS of the plurality of SSs in one symbol of the same slot is quasi-collocated with one pilot signal of the least one pilot signal, and a second SS of the plurality of SSs in another symbol of the same slot is quasi-collocated with another pilot signal of the at least one pilot signal.

In one configuration, each of the SS includes a single-symbol PSS or a single-symbol SSS.

In one configuration, the apparatus 1202, and in particular the baseband unit 1204, includes means for transmitting information indicating the SS is quasi-collocated with the at least one pilot signal.

In one configuration, the information indicating the SS is quasi-collocated with the at least one pilot signal includes at least one of a QCL type or a TCI state ID associated with transmission of the at least one pilot signal by the base station.

In one configuration, the information indicating the SS is quasi-collocated with the at least one pilot signal includes a mapping of at least one location of the at least one pilot signal in a first BWP to another location of the in at least one other BWP.

In one configuration, the single symbol in which the SS is transmitted at least partially overlaps with at least another symbol that includes the at least one pilot signal.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The specific order or hierarchy of blocks or operations in each of the foregoing processes, flowcharts, and other diagrams disclosed herein is an illustration of example approaches. Based upon design preferences, one of ordinary skill will readily recognize that the specific order or hierarchy of blocks each the processes, flowcharts, and other diagrams may be rearranged, omitted, and/or contemporaneously performed without departing from the scope of the present disclosure. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method at a UE that includes applying a set of parameters associated with receiving at least one pilot signal over a time period for receiving at least one SS that is quasi-collocated with the at least one pilot signal; and receiving the at least one SS based on applying the set of parameters over the time period.

Example 2 may include the method of example 1, and the set of parameters includes at least one of a Doppler shift, an average delay, or a RX spatial parameter.

Example 3 may include the method of example 1, and the at least one pilot signal includes an SS/PBCH block, a CSI-RS, or a TRS.

Example 4 may include the method of example 1, and the time period corresponds with a periodicity of SS transmission.

Example 5 may include the method of example 1, and each of the at least one SS includes a PSS or a single-symbol SSS.

Example 6 may include the method of example 1, further including: receiving, from a base station, information indicating the at least one pilot signal is quasi-collocated with the at least one SS; and determining at least one of the set of parameters based on the information.

Example 7 may include the method of example 6, and the information indicating the at least one pilot signal is quasi-collocated with the at least one SS includes at least one of a QCL type or a TCI state ID associated with transmission of the at least one pilot signal by the base station.

Example 8 may include the method of example 6, and the information indicating the at least one pilot signal is quasi-collocated with the at least one SS includes a mapping of at least one location of the at least one pilot signal in a first BWP to at least one other location of the at least one SS in at least one other BWP.

Example 9 may include the method of example 8, further including: calculating at least one of a Doppler shift, a Doppler spread, a delay shift, an average delay, or a spatial parameter based on receiving the at least one pilot signal, and at least one of the set of parameters is based on the calculated at least one of the Doppler shift, the Doppler spread, the delay shift, or the average delay.

Example 10 may include the method of example 8, and the time period for receiving the at least one SS at least partially overlaps with at least one symbol that includes the at least one pilot signal.

Example 11 may include the method of example 10, and the set of parameters is applied based on the time period for receiving the at least one SS at least partially overlapping with the at least one symbol that includes the at least one pilot signal.

Example 12 may be a method of wireless communication at a base station, including: transmitting at least one pilot signal using a first set of transmission parameters; and transmitting a SS that occupies a single symbol using a second set of transmission parameters quasi-collocating the SS with the at least one pilot signal.

Example 13 may include the method of example 12, further including: configuring the second set of transmission parameters to quasi-collocate the SS with the at least one pilot signal, the SS having at least one of a Doppler shift, average delay, or spatial parameter in common with the at least one pilot signal.

Example 14 may include the method of example 12, and the at least one pilot signal includes an SS/PBCH block, a CSI-RS, or a TRS.

Example 15 may include the method of example 12, and the transmitting the SS that occupies the single symbol includes: transmitting each of a plurality of SSs in a different single symbol of a same slot.

Example 16 may include the method of example 15, and a first SS of the plurality of SSs in one symbol of the same slot is quasi-collocated with one pilot signal of the least one pilot signal, and a second SS of the plurality of SSs in another symbol of the same slot is quasi-collocated with another pilot signal of the at least one pilot signal.

Example 17 may include the method of example 12, and each of the SS includes a single-symbol PSS or a single-symbol SSS.

Example 18 may include the method of example 12, further including: transmitting information indicating the SS is quasi-collocated with the at least one pilot signal.

Example 19 may include the method of example 18, and the information indicating the SS is quasi-collocated with the at least one pilot signal includes at least one of a QCL type or a TCI state ID associated with transmission of the at least one pilot signal by the base station.

Example 20 may include method of example 18, and the information indicating the SS is quasi-collocated with the at least one pilot signal includes a mapping of at least one location of the at least one pilot signal in a first BWP to another location of the in at least one other BWP.

Example 21 may include method of example 20, and the single symbol in which the SS is transmitted at least partially overlaps with at least another symbol that includes the at least one pilot signal.

The previous description is provided to enable any person of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include some communication and/or memory operations/procedures through which some information or value(s) are acquired, such as "receiving" (e.g., receiving information), "accessing" (e.g., accessing data in a memory), "detecting," and the like.

As another example, reference to an element in the singular is not intended to mean "one and only one" unless specifically so stated, but rather "one or more." In particular, reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    receiving a pilot signal within a first time period, wherein the pilot signal is one of a synchronization signal and physical broadcast channel (SS/PBCH), a channel state information reference signal (CSI-RS), or a tracking reference signal (TRS);
    identifying a quasi-colocation (QCL) relationship between at least one lean synchronization signal (SS) and the pilot signal;
    applying a set of parameters for receiving the at least one lean SS based on the QCL relationship between the at least one lean SS and the pilot signal, the set of parameters associated with receiving the at least one lean SS within a second time period subsequent to the first time period; and
    receiving the at least one lean SS within the second time period subsequent to the first time period based on applying the set of parameters.

2. The method of claim 1, wherein the set of parameters comprises at least one of a Doppler shift, an average delay, or a receive (RX) spatial parameter.

3. The method of claim 1, wherein the second time period corresponds with a transmission periodicity of the at least one lean SS.

4. The method of claim 1, wherein each of the at least one lean SS comprises a single-symbol primary SS (PSS) or a single-symbol secondary SS (SSS).

5. The method of claim 1, further comprising:
    receiving, from a base station, information indicating the pilot signal is quasi-collocated with the at least one lean SS; and
    determining at least one of the set of parameters based on the information.

6. The method of claim 5, wherein the information indicating the pilot signal is quasi-collocated with the at least one lean SS comprises at least one of a quasi-collocation (QCL) type or a transmission configuration indication (TCI) state identifier (ID) associated with transmission of the pilot signal by the base station.

7. The method of claim 5, wherein the information indicating the pilot signal is quasi-collocated with the at least one lean SS comprises a mapping of a first location of the pilot signal in a first bandwidth part (BWP) to a second location of the at least one lean SS in a second BWP.

8. The method of claim 7, further comprising:
    calculating at least one of a Doppler shift, a Doppler spread, a delay shift, an average delay, or a spatial parameter based on receiving the pilot signal, wherein at least one of the set of parameters is based on the calculated at least one of the Doppler shift, the Doppler spread, the delay shift, or the average delay.

9. The method of claim 1, wherein the at least one lean SS at least partially overlaps in time with at least one symbol that includes the pilot signal.

10. The method of claim 9, wherein the QCL relationship is identified based on the at least one lean SS at least partially overlapping in time with the at least one symbol that includes the pilot signal.

11. The method of claim 1, wherein the set of parameters comprises a first parameter and a second parameter, wherein the first parameter comprises a spatial parameter based on the pilot signal, and wherein the second parameter comprises a UE-configurable parameter based on the first parameter.

12. The method of claim 1, wherein identifying the QCL relationship between the at least one lean SS and the pilot signal is based on the pilot signal overlapping in time with the at least one lean SS, and wherein the method further comprises:
determining at least one of:
the at least one lean SS shares a Doppler shift and an average delay with the pilot signal, indicative of a type C QCL relationship between the at least one lean SS and the pilot signal, or
the at least one lean SS shares a receive (RX) spatial parameter with the pilot signal indicative of a type D QCL relationship between the at least one lean SS and the pilot signal.

13. An apparatus for wireless communication at a user equipment (UE), comprising:
a memory; and
at least one processor coupled to the memory and configured to:
receiving a pilot signal within a first time period, wherein the pilot signal is one of a synchronization signal and physical broadcast channel (SS/PBCH), a channel state information reference signal (CSI-RS), or a tracking reference signal (TRS);
identifying a quasi-colocation (QCL) relationship between at least one lean synchronization signal (SS) and the pilot signal;
apply a set of parameters for receiving the at least one lean SS based on the QCL relationship between the at least one lean SS and the pilot signal, the set of parameters associated with receiving the at least one lean SS within a second time period subsequent to the first time period; and
receive the at least one lean SS within the second time period subsequent to the first time period based on applying the set of parameters.

14. The apparatus of claim 13, wherein the set of parameters comprises at least one of a Doppler shift, an average delay, or a receive (RX) spatial parameter.

15. The apparatus of claim 13, wherein the second time period corresponds with a transmission periodicity of the at least one lean SS.

16. The apparatus of claim 13, wherein each of the at least one lean SS comprises a single-symbol primary SS (PSS) or a single-symbol secondary SS (SSS).

17. The apparatus of claim 13, wherein the at least one processor is further configured to:
receive, from a base station, information indicating the pilot signal is quasi-collocated with the at least one lean SS; and
determine at least one of the set of parameters based on the information.

18. The apparatus of claim 17, wherein the information indicating the pilot signal is quasi-collocated with the at least one lean SS comprises at least one of a quasi-collocation (QCL) type or a transmission configuration indication (TCI) state identifier (ID) associated with transmission of the pilot signal by the base station.

19. The apparatus of claim 17, wherein the information indicating the pilot signal is quasi-collocated with the at least one lean SS comprises a mapping of a first location of the pilot signal in a first bandwidth part (BWP) to a second location of the at least one lean SS in a second BWP.

20. The apparatus of claim 19, wherein the at least one processor is further configured to:
calculate at least one of a Doppler shift, a Doppler spread, a delay shift, an average delay, or a spatial parameter based on receiving the pilot signal, wherein at least one of the set of parameters is based on the calculated at least one of the Doppler shift, the Doppler spread, the delay shift, or the average delay.

21. The apparatus of claim 13, wherein the at least one lean SS at least partially overlaps in time with at least one symbol that includes the pilot signal.

22. The apparatus of claim 21, wherein the QCL relationship is identified based on the at least one lean SS at least partially overlapping in time with the at least one symbol that includes the pilot signal.

23. The apparatus of claim 13, wherein the at least one processor, being configured to identify the QCL relationship, is further configured to:
identify a type of the QCL relationship based on a type of the pilot signal.

24. The apparatus of claim 23, wherein the type of the QCL relationship is identified based on a look-up table indexed by at least one transmission configuration indication (TCI) state identifier (ID), and wherein each of the at least one TCI IDs corresponds to one or more types of QCL relationships and one or more types of pilot signals.

25. The apparatus of claim 23, wherein the type of the QCL relationship comprises QCL type A, QCL type C, or QCL Type D.

* * * * *